Aug. 22, 1939.　　　C. C. FARMER ET AL　　　2,170,237
BRAKE CONTROL MEANS
Filed April 20, 1937　　　2 Sheets-Sheet 2
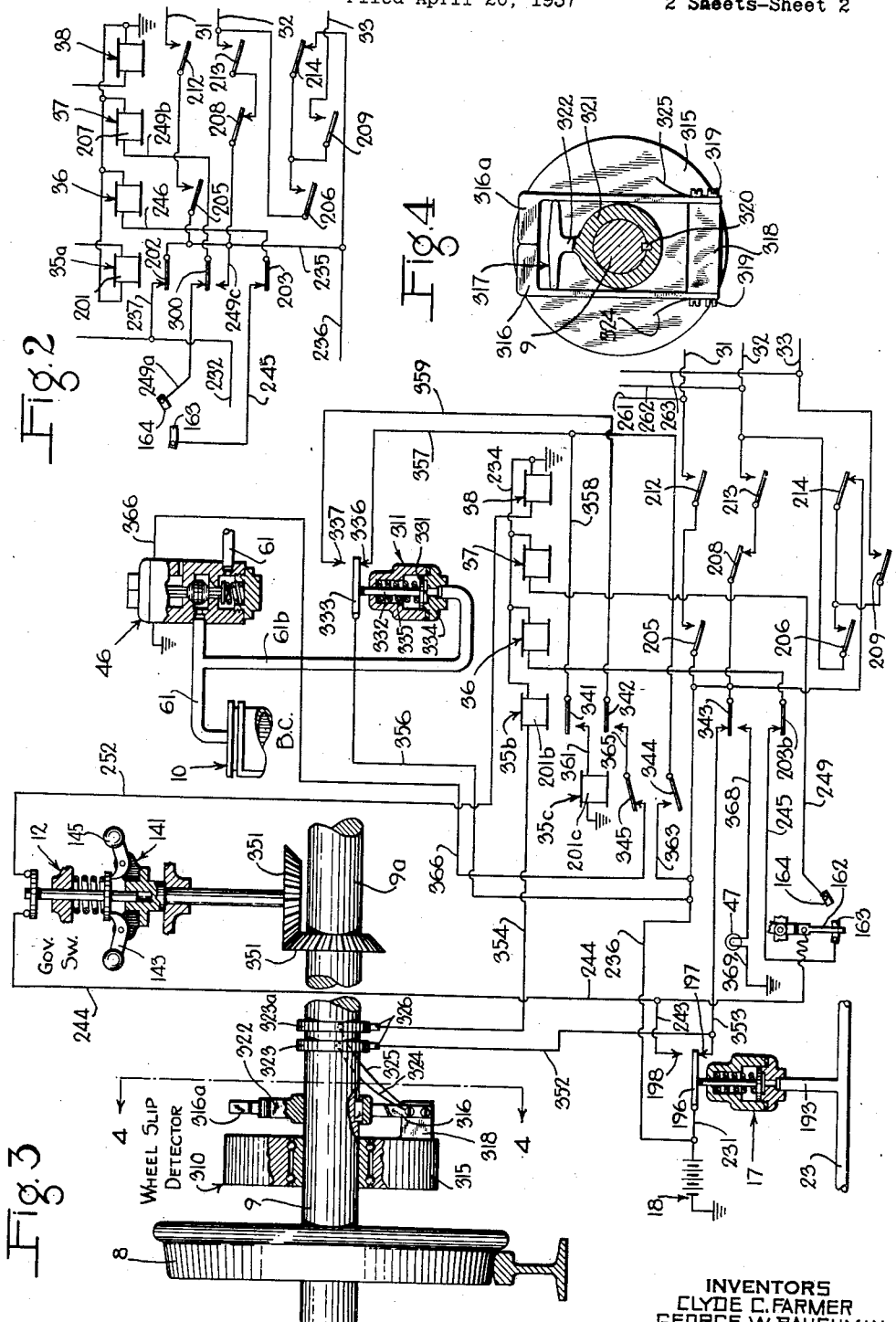
INVENTORS
CLYDE C. FARMER
GEORGE W. BAUGHMAN
BY Wm. M. Cady
ATTORNEY Patented Aug. 22, 1939

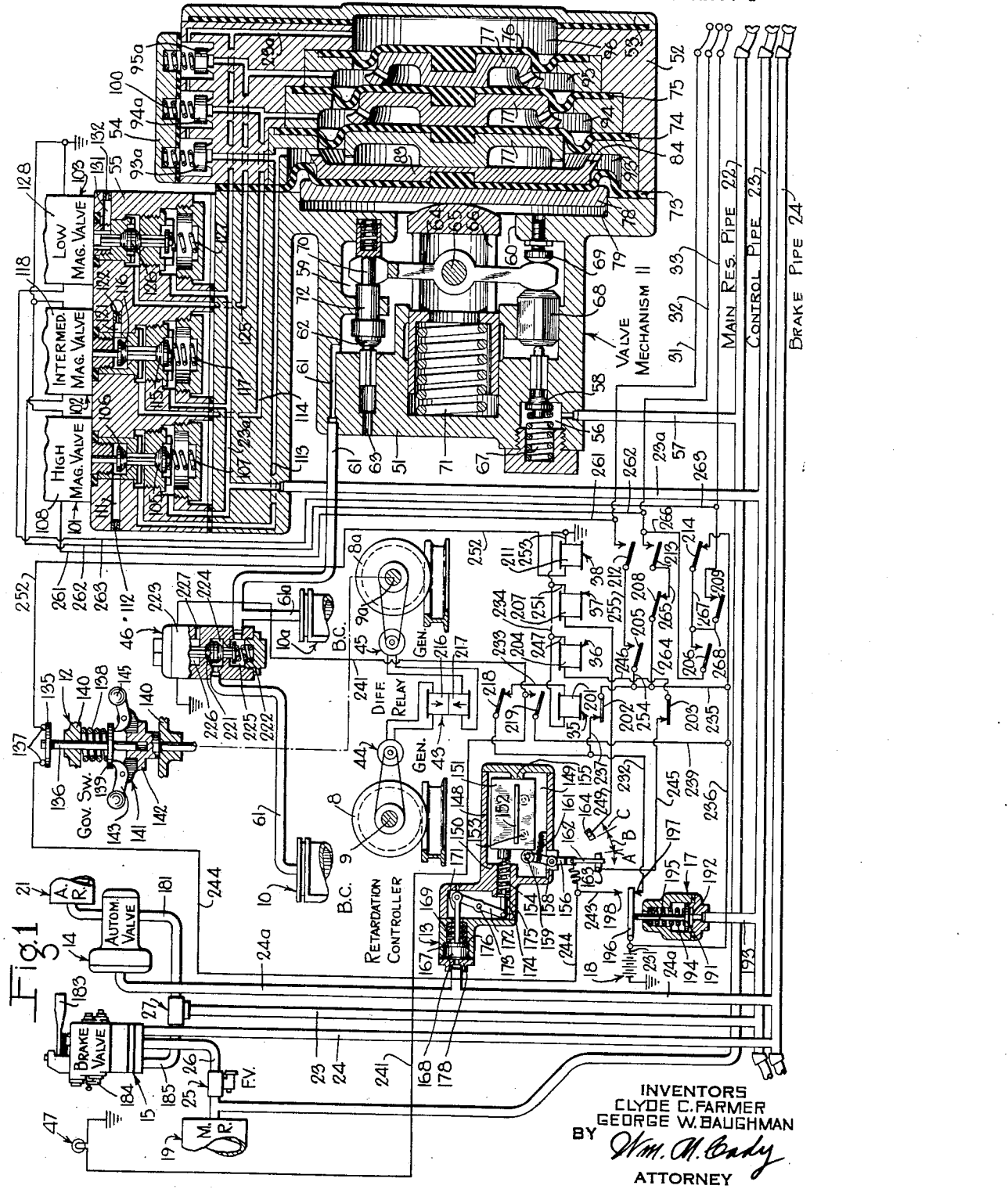

2,170,237

UNITED STATES PATENT OFFICE 2,170,237

BRAKE CONTROL MEANS

Clyde C. Farmer, Pittsburgh, and George W. Baughman, Edgewood, Pa., assignors to The Westinghouse Air Brake Company, Wilmerding, Pa., a corporation of Pennsylvania Application April 20, 1937, Serial No. 137,954

39 Claims. (Cl. 303—21)

This invention relates to brake control means and more particularly to brake control equipments for high speed trains whereby the brakes are automatically controlled both according to the speed of the train and according to the rate of retardation of the train.

Present-day high speed trains intended to travel normally at speeds in excess of one hundred miles per hour, have presented numerous problems incidental to the adequate braking of the train whereby the train may be brought to a stop from a high speed over stopping distances substantially the same as obtained in the case of present-day, lower speed, trains. Various brake control equipments for high speed trains have been proposed for automatically controlling the brakes on the trains, both according to the speed of the train and according to the rate of retardation of the train, so as to bring the train to a stop from a high speed within a reasonable stopping distance, comparable to stopping distances obtaining in the case of low speed trains, without causing undue sliding of the wheels.

One of such brake control equipments for high speed trains is described and claimed in the copending application of George W. Baughman, one of the present joint applicants, now Patent 2,096,505 assigned to the assignee of the present application.

It is an object of the present invention to provide, in a brake control equipment for high speed trains of the character described in the copending application just mentioned, additional features including means for detecting wheel slipping and for effecting automatically a reduction in the degree of the application to guard against and prevent a wheel sliding condition. It will be understood that the term "slipping" and the term "sliding", as employed herein with respect to vehicle wheels have definitely different meanings. As used herein, the term "wheel-slipping" or "wheel-slip" refers to the condition wherein a vehicle wheel is slowing down from a rotative speed, corresponding to the speed of travel of the vehicle, to zero speed corresponding to the locked condition of the wheel. As used in the present application, the term "wheel-sliding" designates that condition of a vehicle wheel wherein it is locked against rotation while the vehicle continues to travel along the track rails.

Another object of our invention is to provide novel means for detecting a wheel-slipping or a wheel-sliding condition.

A further object of our invention is to provide, in a brake control equipment of the character indicated in the first mentioned object, a wheel-slip detecting means associated with one wheel-and-axle unit which is more heavily braked than the other wheel-and-brake units of the train, for automatically controlling the brakes associated with the other wheel-and-axle units on the train to prevent the attainment of such a braking force thereon as would induce a wheel-slipping or a wheel-sliding condition.

The above objects and other and more specific objects which will appear in the subsequent description of our invention, are attained by means of illustrative embodiments hereinafter described and shown in the accompanying drawings, wherein, Fig. 1 is a simplified diagrammatic view, with parts thereof in section, showing a brake control equipment for one car of a train and constituting one embodiment of my invention, Fig. 2 is a fragmentary diagrammatic view, illustrating one possible modified arrangement of the control circuits shown in the embodiment represented in Fig. 1.

Fig. 3 is a fragmentary diagrammatic view of another embodiment of my invention which differs from the embodiment shown in Fig. 1 principally in the provision of a different type of mechanism for detecting a wheel-slip condition, and Fig. 4 is a sectional view, taken on the line 4—4 of Fig. 3, showing in further detail the construction of the wheel-slip detecting mechanism.

BRIEF DESCRIPTION OF EQUIPMENT SHOWN IN FIG. 1

Referring to Fig. 1, the brake control equipment comprises at least one brake cylinder 10 for applying and releasing the brakes associated with one wheel-and-axle unit, indicated by the wheel 8 and axle 9, and at least one brake cylinder 10a for applying and releasing the brakes associated with another wheel-and-axle unit of the car or train and represented by the wheel 8a and axle 9a, a brake control valve mechanism 11 for controlling the supply of fluid under pressure to and the release of fluid under pressure from the brake cylinders 10 and 10a, a speed-controlled or governor switch device 12, an inertia device hereinafter called a retardation controller 13, an automatic valve device 14, a manually operated brake valve device 15, and a fluid pressure operated switch device 17 for controlling electrical connections, hereinafter described, to a suitable source of electrical energy such as a battery 18.

Also included in the equipment are a main reservoir 19 charged with fluid under pressure in well known manner from a fluid compressor, not shown, an auxiliary reservoir 21, the supply of fluid under pressure to and from which is controlled by the automatic valve device 14, a feed valve device 25 of standard construction and functioning in well known manner to regulate the pressure of fluid supplied from the main reservoir 19 into a pipe 26, hereinafter designated the feed valve pipe, to a substantially uniform pressure lower than that to which the reservoir 19 is charged, and a double check valve device 27. Also provided are three pipes indicated as extending through all the cars of the train and hereinafter designated the main reservoir pipe 22, the control pipe 23 and the brake pipe 24.

There are also three train wires 31, 32 and 33, hereinafter referred to as the high wire, the intermediate wire and the low wire, and according to our invention, energization and deenergization of the train wires 31, 32 and 33 is effected in the manner hereinafter described under the control of four electrical relay devices, hereinafter respectively called the wheel-slip relay 35, the low-retardation relay 36, the high-retardation relay 37 and the speed relay 38.

The speed relay 38 is controlled by the governor switch device 12 in the manner to be hereinafter described and the retardation relays 36 and 37 are controlled by the retardation controller 13 in the manner also hereinafter described. The wheel-slip relay 35 is controlled by a differential relay 43, which is in turn controlled according to the current supplied thereto from two generators 44 and 45 driven, as through a pulley and belt arrangement in the manner shown, by rotation of the axles 9 and 9a, respectively.

In accordance with our invention, there are also provided a magnet valve device 46 for releasing fluid under pressure from the brake cylinder 10, and a signal device, represented by a signal lamp 47, for indicating to the operator or engineman the occurrence of a wheel-slipping or a wheel-sliding condition of the wheels 8 and axle 9, both the magnet valve device 46 and the signal lamp 47 being under the control of the differential relay 43.

The brake control equipment shown in Fig. 1 is adapted for use on trains of either the articulated or the non-articulated type and only so much of the equipment is shown as illustrates the operation thereof, the control of the brakes associated with wheels and wheel-and-axle units other than those shown being effected in a manner similar to that described for the particular wheel-and-axle units shown.

DETAILED DESCRIPTION OF EQUIPMENT SHOWN IN FIG. 1

(a) Brake control valve mechanism 11

The brake control valve mechanism 11 represents, in simplified form, a type of valve device described in detail and claimed in the copending application of Ellis E. Hewitt, now Patent 2,140,624 assigned to the assignee of the present application, certain parts of the valve device shown and described in the patent being omitted in the present application for the sake of simplicity.

In view of the fact that the valve mechanism 11 is described in detail both as to construction and operation in Patent 2,140,624, the valve mechanism 11 is described herein only in a brief manner sufficient to offer comprehension of the construction and operation thereof. Valve mechanism 11 is embodied in a sectional casing comprising a valve section 51, a diaphragm section 52 secured to the valve section 51 as by bolts, not shown, two cover sections 53 and 54, respectively, secured to the diaphragm section 52 as by bolts, not shown, and a magnet valve section 55 secured to the valve section 51 as by bolts, not shown.

Formed in the casing section 51 is a chamber 56 which is constantly connected to the main reservoir pipe 22 through a branch pipe 57 and which contains a valve of the poppet type, hereinafter designated supply valve 58. Also formed in the casing section 51 is a chamber 59 which communicates with the brake cylinders 10 and 10a through a pipe and passage 61 and which contains a valve of the poppet type, hereinafter designated the release valve 62, for controlling the venting of fluid under pressure from the chamber 59 and the brake cylinders 10 and 10a through an exhaust port 63.

Operation of the supply valve and release valve is effected by rocking movement of a lever 64 which is pivoted substantially intermediate the ends thereof as by a pin 65 on a slidable member 66.

The supply valve 58 is normally yieldingly urged into seated position on an associated valve seat by a biasing spring 67, the inner end of the fluted stem of the supply valve 58 engaging one end of a fluted spacer 68 slidable in the casing section 51, the other end of the spacer 68 engaging the lower end of the lever 64 and urging it into substantial contact with an adjustable stop screw 69. The slidable member 66 is yieldingly urged in the right-hand direction by a spring 71 so that the lever 64 is pivoted about its lower end which is held between the stop screw 69 and the spacer 68.

The release valve 62 is carried on a stem 72 slidable in the casing section 51 and having two spaced shoulders connected by a reduced portion 70 which is straddled by the upper bifurcated end of the lever 64 in such manner that the upper end of the lever 64 is free to pivot at the upper end thereof between the spaced shoulders.

With the lower end of the lever 64 held between the spacer 68 and the stop screw 69, the shifting of the slidable member 66 in the right-hand direction by the spring 71 causes a shifting of the slidable stem 72 and the release valve 62 in the right-hand direction to unseat the valve 62 and permit fluid under pressure in the chamber 59 and in the brake cylinders to exhaust to atmosphere through the exhaust port 63.

When a force is applied to the right-hand end of the slidable member 66, as in the manner to be hereinafter described, and the slidable member 66 is urged in the left-hand direction from the normal position shown, the spring 67 holds the supply valve 58 seated and the spring 71 yields so that the lever 64 is pivoted at its lower end and the upper end shifted in the left-hand direction to cause the release valve 62 to engage its associated valve seat to close off the connection from the chamber 59 to atmosphere through the exhaust port 63. Thereafter, as the slidable member 66 is further shifted in the left-hand direction, the lever 64 pivots at its upper bifurcated end and the lower end is shifted in the left-hand direction to effect unseating of the supply valve 58 against the force of the spring 67.

When the force urging the slidable member 66 in the left-hand direction is relieved the spring 67 acts to seat the supply valve 58 and thus rock the lever 64 about the pin 65 to maintain the release valve 62 seated. After the supply valve 58 is seated, the spring 67 is no longer effective in rocking the lever 64 about the pin 65 and the spring 71 then acts to rock the lever 64 in a clockwise direction about the lower end thereof which is held between the spacer 68 and the stop screw 69 to effect unseating of the release valve 62.

Contained in the casing section 52 are a plurality of movable abutments or diaphragms 73, 74, 75 and 76 of successively smaller effective pressure areas in the order named, the diaphragms being suitably clamped at the periphery thereof and disposed in spaced coaxial relation. The arrangement of the diaphragms 73, 74, 75 and 76 is such as to form a chamber 93 between the diaphragms 73 and 74, a chamber 94 between the diaphragms 74 and 75, a chamber 95 between the diaphragms 75 and 76 and a chamber 96 between the diaphragm 76 and the cover section 53, the latter chamber being constantly connected to the control pipe 23 through a pipe and passage 23a.

In order to maintain a minimum spacing between the successive diaphragms, a cup-shaped spacer 77 is attached in suitable manner to one face of each of the diaphragms 74, 75 and 76 without perforating the diaphragm. The spacer 77 associated with the diaphragm 76 is adapted to engage the diaphragm 75, spacer 77 associated with the diaphragm 75 is adapted to engage the diaphragm 74 and the spacer 77 associated with the diaphragm 74 is adapted to engage a follower plate 83 suitably attached to one face of the largest diaphragm 73 in a manner not necessitating perforation of the diaphragm. The follower plate 83 has an outwardly flared flange or skirt 84 thereon which engages a stop shoulder on the casing section 52 to limit the movement of the diaphragm 73 in the right-hand direction.

Associated with the face of the largest diaphragm 73 opposite to the follower plate 83 is a follower disc 78 which is slidably movable in a bore 79 in the casing section 51, the bore 79 being open at the central portion thereof, through an opening 60, to the chamber 59. The right-hand end of the slidable member 66 contained in the valve section 51 engages the follower disc 78 and the spring 71 urging the slidable member 66 in the right-hand direction is thus effective to shift the diaphragms 73, 74, 75 and 76 in the right-hand direction until the flared flange 84 on the follower plate 83 engages the stop shoulder on the casing section 52.

It will be observed that the diaphragms 73, 74, 75 and 76 are unconnected and that they may be moved collectively or individually.

Interposed between the chambers 93, 94 and 95 and the passage 23a are check valves 93a, 94a and 95a, respectively, which are yieldingly urged into seated relation on an associated valve seat by lightly tensioned return springs 100. The check valves 93a, 94a and 95a are unseated to effect substantial equalization of the pressure in the chambers 93, 94 and 95 with the pressure in the passage 23a and in the control pipe 23 upon a reduction of the pressure in the control pipe 23 below the pressure in the chambers but are actuated to seated position to prevent the flow of fluid under pressure from the control pipe 23 and passage 23a to the chambers 93, 94 and 95 therepast upon an increase in the pressure in the control pipe 23. The purpose of the check valve 93a, 94a and 95a will be understood more clearly from subsequent description.

The magnet valve casing section 55 contains three electromagnet valve devices, hereinafter designated the high magnet valve device 101, the intermediate magnet valve device 102 and the low magnet valve device 103, which function to control the supply and the release of fluid under pressure from the chambers 93, 94 and 95 respectively.

The high magnet valve device 101 comprises a pair of oppositely seating valves, hereinafter called the supply valve 105 and the release valve 106, which are yieldingly urged by a spring 107 into seated and unseated positions, respectively, and which are actuated against the force of the spring 107 into unseated and seated positions, respectively, upon energization of an electromagnet 108. With the release valve 106 unseated as shown, communication is established from a passage 113, connected to the chamber 93 between the diaphragms 73 and 74, to an atmospheric exhaust passage 111 containing a choke fitting 112, this communication being closed when the release valve 106 is seated. When the supply valve 105 is unseated communication is established from the pasage 23a to the passage 113 to charge the chamber 93 with fluid under pressure from the control pipe 23, this communication being closed when the supply valve 105 is seated.

The intermediate magnet valve device 102 is identical in construction to the high magnet valve device 101 and comprises a pair of oppositely seating valves, hereinafter called the supply valve 115 and the release valve 116, which are yieldingly urged into seated and unseated positions respectively by a spring 117 and actuated against the force of the spring 117 into unseated and seated positions, respectively, upon energization of an electromagnet 118. With the release valve 116 unseated, as shown, communication is established from a pasage 114, connected to the chamber 94 between the diaphragms 74 and 75, to an atmospheric exhaust passage 121 containing a choke fitting 122, this communication being closed when the release valve 116 is seated.

With the supply valve 115 unseated, communication is established from the passage 23a to the passage 114 leading to the chamber 94 so that the chamber 94 is thus charged to the pressure in the control pipe 23, this communication being closed when the supply valve 115 is seated.

The low magnet valve device 103 comprises a double beat valve 126 which is urged to an upper seated position by a spring 127 and to a lower seated position against the force of a spring 127 upon energization of an electromagnet 128. With the double beat valve 126 in its upper seated position, communication is established from the passage 23a to a passage 125 leading to the chamber 95 between the diaphragms 75 and 76, so that the chamber 95 is charged with fluid at the pressure established in the control pipe 23. With the double beat valve 126 in its lower seated position, communication through which the chamber 95 is charged is closed and another communication is established through which the passage 125 leading from the chamber 95 is connected to an exhaust passage 131 containing a choke fitting 132, this exhaust communication being closed when the double beat valve is in its upper seated position.

(b) *Governor switch device 12*

The governor switch device 12 may be of any siutable construction and is illustrated diagrammatically in simplified form as comprising a contact bridging member 135 carried in insulated relation on a stem 136 slidably mounted in a casing 140, a portion of which is shown, the member 135 being adapted to engage a pair of insulated resilient contact fingers 137 in circuit-closing relation. A biasing spring 138, interposed between a collar or flange 139 fixed on the stem 136 and a portion of the casing 140 yieldingly urges the stem 136 in a direction to effect disengagement of the contact bridging member 135 from the contact fingers 137. A centrifuge 141 urges the stem 136 in the opposite direction, against the force of the spring 138, to effect engagement of the contact bridging member 135 with the contact fingers 137. The centrifuge 141 comprises a rotary element 142 which is suitably journaled in a portion of the casing 140 and rotated according to the speed of travel of the train as by a driving connection to a wheel-axle, such as the axle 9a, which driving connection is diagrammatically shown by the broken line. Two or more levers 143 carrying fly-balls 145 at the outer ends thereof are so mounted on the rotary element 142 that when the fly-balls 145 move outwardly under the influence of centrifugal force, the inner ends of the levers exert an upward force on the flange 139 of the stem 136. The spring 138, the levers 143, and fly-balls 145 are so designed that upward movement of the stem 136, in opposition to the force of the spring 138, sufficient to cause engagement of the contact bridging member 135 with the contact fingers 137 is not effected unless the speed of the train as reflected in the speed of rotation of the rotary element 142 exceeds a certain uniform or chosen speed, such as forty miles per hour.

(c) *Retardation controller device 13*

The retardation controller device 13 may comprise a casing 148 having a chamber 149 containing an inertia element 151 in the form of a heavy weight, which is suitably mounted for horizontal movement in the casing, in a frictionless manner, as by providing flanges 152 on opposite sides of the inertia element, only one of which flanges is shown, and supporting the inertia element by means of the flanges on frictionless rollers 153 carried on the casing 148.

The retardation controller device 13 is mounted on a car of the train in such manner that when the brakes are applied, the inertia element 151 shifts toward the head end of the train, corresponding to the left-hand direction in Fig. 1, against the force of a yielding spring 154. When the train is at rest or traveling at a substantially constant rate of speed, spring 154 urges the inertia element in the right-hand direction into contact with a stop lug 155 formed on or attached to the casing 148. The degree to which the inertia element 151 shifts in the left-hand direction away from the stop lug 155 increases in proportion to the increase in the rate of retardation of the train, the maximum movement of the inertia element 151 in the left-hand direction being determined by a stop shoulder 150 on the casing which is engaged by the inertia element.

A lever 156 is pivotally mounted on the casing 148 and extends through a slot or opening 158 in the wall of the casing 148. The inner end of the lever 156, within the chamber 149, carries a roller 159 and the outer end of the lever has secured thereto, in insulated relation, a contact finger 162. In the normal position of the inertia element 151, the roller 159 is biased into contact with the left-hand edge of the inertia element by a lightly tensioned return spring 161 which is connected at one end to the casing 148 and at the opposite end to the inner end of the lever 156. Upon an application of the brakes, the shifting of the inertia element 151 in the left-hand direction causes a counterclockwise rotation of the lever 156.

In its normal or vertical position, the contact finger 162 engages a stationary contact segment 163. As the lever 156 is rotated in a counterclockwise direction, the contact finger 162 slides along the contact segment 163, disengages the segment 163, travels through a predetermined arc and then engages another contact segment 164. The spring 154 may be suitably designed and tensioned, and the segments 163 and 164 may be so arranged and disposed as to cause the contact finger 162 to disengage the segment 163 when the rate of retardation of the train exceeds a certain uniform rate, such as two miles per hour per second, and so that the contact finger 162 does not engage the contact segment 164 unless the rate of retardation of the train exceeds another higher certain uniform rate of retardation, such as three miles per hour per second. For simplicity, the range of retardation rates over which the contact finger 162 engages the contact segment 163 will hereinafter be termed range A of retardation rates, the range of retardation rates over which the contact finger 162 engages neither the segment 163 nor the segment 164 will be termed range B, and the range of retardation rates over which the contact finger 162 engages the contact segment 164 will be termed range C.

Suitable means is provided for increasing the initial tension of the spring 154 so as to necessitate a higher rate of retardation of the train to produce a given degree of movement of the contact finger 162 from its normal position and thus correspondingly affect the ranges A, B, and C of retardation rates. For example, a mechanism such as is described and claimed in the copending application of Ellis E. Hewitt, now Patent 2,147,295 and assigned to the assignee of the present application, may be provided. As shown in Fig. 1, such mechanism may comprise a piston 167 which is subject on one side to the pressure of fluid in a chamber 168 constantly connected to the brake pipe 24 by a branch pipe 24a, and subject on the opposite side to the opposing pressure of a spring 169. The piston 167 has a stem 171 which is pivotally connected to one end of a lever 172, the opposite end of which has pivotally connected thereto a stem 174 carrying thereon in fixed relation a collar or flange 175 against which the spring 154 presses. The lever 172 is pivoted intermediate the ends thereof, as on a pin 173 carried by the casing 148, and when the pressure in the chamber 168 exceeds a certain predetermined pressure sufficient to overcome the spring 169 and shift the piston in the right-hand direction into engagement with a stop-shoulder 176 formed on the casing, the flange 175 is positioned as shown to determine the initial tension of the spring 154 for service applications of the brakes. When a sufficient reduction in the pressure of the fluid in the chamber 168 from the normal brake pipe pressure carried therein is effected, as in the case of emergency applications of the brakes, the spring 169 acts to shift the piston 167 in the left-hand direction until the piston strikes the cap or cover 178 closing the open end of the chamber 168, the stop flange 175 being correspondingly shifted in the right-hand direction to increase the initial tension of the spring 154.

It will accordingly be readily apparent that by suitably selecting the length of the lever 172 and the pivotal point of pin 173 intermediate the ends of lever 172, any desired degree of increase in the initial tension of the spring 154 as between service applications and emergency applications of the brakes may be effected whereby the ranges A, B and C of retardation rates may be correspondingly varied. For example, instead of the previously given limits for ranges A, B and C, the range A for emergency application of the brakes may cover from zero to three miles per hour per second, range B may cover from three to four and one-half miles per hour per second, and range C may cover retardation rates in excess of four and one-half miles per hour per second.

(d) Automatic valve device 14

The automatic valve device 14 shown is preferably of conventional design and representative of any of the familiar standard types of automatic valve devices, such as the well known triple valve device, which is effective in response to reduction in pressure in the brake pipe 24 at a service rate or at an emergency rate, to supply fluid under pressure from the auxiliary reservoir 21 to a pipe 181 leading to one side of the double check valve device 27 and which is effective upon an increase in brake pipe pressure to release fluid under pressure from the pipe 181 and to effect charging of the auxiliary reservoir 21 from the brake pipe 24.

(e) Brake valve device 15

The brake valve device 15 may be of any suitable construction and for purposes of the present application there is illustratively employed a brake valve device of the type described and claimed in the copending application Serial No. 105,659, of Ellis E. Hewitt, filed October 15, 1936, and assigned to the assignee of the present application. It is deemed unnecessary for purposes of the present application to describe the brake valve device 15 in detail, it being necessary to understand merely that the single handle 183 of the brake valve device is operative over the same zone or range of movement in a horizontal plane to effect straight-air applications of the brakes or automatic applications of the brakes, depending upon whether a manually operative selector element 184 is positioned in a straight-air application position or an automatic application position.

With the selector element 184 in straight-air position, the shifting of the operating handle 183 of the brake valve device 15 from its normal release position into the application zone, causes fluid under pressure to be supplied from the pipe 26, leading from the feed valve device 25 and hereinafter termed feed valve pipe 26, to a pipe 185 leading to the side of the double check valve 27 opposite to that to which the pipe 181 from the automatic valve device 14 is connected. The brake valve device 15 includes a self-lapping valve mechanism effective for straight-air operations, and thus the pressure attained in the pipe 185 is in proportion to the degree of movement of the operating handle 183 out of its normal release position into the application zone. The construction of the brake valve device 15 is such that when the handle 183 reaches the full service position thereof, a maximum pressure is attained in the pipe 185, and even though the operating handle 183 is shifted beyond the full service position to an emergency position, no further increase in the pressure in the pipe 185 occurs beyond the maximum pressure for a full service application of the brakes.

With the operating handle 183 of the brake valve device 15 in its normal release position, and with the selector element 184 in either the straight-air position or automatic position, the pipe 185 is vented to atmosphere and the brake pipe 24 is charged with fluid under pressure from the feed valve pipe 26. During straight-air operation of the brake valve device 15, connections are maintained through the brake valve device so that the brake pipe 24 remains charged to the normal pressure therefor.

With the selector element 184 of the brake valve device 15 in the automatic position thereof, the operating handle 183 is operative to effect reduction in the brake pipe pressure at a service rate and to a desired degree, for service applications of the brakes. Shifting of the operating handle 183 to emergency position while the selector element 184 is in automatic position, causes reduction in brake pipe pressure at an emergency rate and at the same time causes fluid under pressure to be supplied from the feed valve pipe 26 to the pipe 185 to the maximum degree of pressure attainable therein, that is, to the degree of pressure corresponding to a full service application of the brakes.

The double check valve device 27 is of standard construction and includes a shiftable piston valve, not shown, which is subject on one side to the pressure in the pipe 181 and on the opposite side to the pressure in the pipe 185 and which is effective to establish connection between either the pipe 181 or the pipe 185 and the control pipe 23, depending upon the relation of the pressure in the two pipes 181 and 185.

As will be hereinafter explained, the maximum pressure established in the pipe 181 for emergency applications of the brakes exceeds the maximum pressure established in the pipe 185 for straight-air applications of the brakes and thus, although both pipes 181 and 185 are simultaneously supplied with fluid under pressure, the pressure in the pipe 181 predominates and thus causes the double check valve device 27 to be conditioned to establish communication from the pipe 181 to the control pipe 23.

(f) Additional equipment and control circuits

The fluid pressure operated switch device 17 may be of any suitable construction and may comprise a casing containing a piston 191 subject on one side to fluid under pressure in a chamber 192 connected by a branch pipe 193 to the control pipe 23. When the pressure of the fluid supplied to the control pipe 23 and acting in the chamber 192 on the one side of the piston 191 exceeds a predetermined low pressure, such as one or two pounds per square inch, the piston 191 is moved against the force of a spring 194, which yieldingly opposes movement of the piston. The piston has a stem 195 carrying, in insulated relation thereon, a contact member 196. The contact member 196 engages a lower contact member 197 when the pressure in the control pipe 23 and chamber 192 is less than the predetermined pressure of one or two pounds per square inch, and is shifted out of engagement with the contact member 197 and into engagement with an upper contact member 198 when the pressure of the fluid in the control pipe and chamber 192 exceeds the predetermined pressure.

The electrical relays 35, 36, 37 and 38 are of any suitable standard construction comprising an electromagnet winding, an associated stationary magnetic core, and a movable armature actuated upon energization of the electromagnet. For simplicity of description, the electrical relays will be described as having "front-contact members" and "back-contact members", and it will be understood that, as employed herein, the term "front-contact member" designates a contact member which is actuated from a circuit-opening to a circuit-closing position when the electromagnet of the relay is energized, and the term "back-contact member" designates a contact member which is actuated from a circuit-closing position to a circuit-opening position when the relay electromagnet is energized. The relay 35 is illustrated diagrammatically as comprising an electromagnet 201 and a pair of front-contact members 202 and 203.

The relay 36 may comprise an electromagnet 204 and a pair of front-contact members 205 and 206.

The relay 37 may comprise an electromagnet 207, a back-contact member 208, and a front-contact member 209.

The relay 38 may comprise an electromagnet 211, two front-contact members 212 and 213, respectively, and a back-contact member 214.

The differential relay 43 may comprise two separate electromagnet coils 216 and 217, connected respectively to the terminals of the generators 44 and 45 as shown, a back-contact member 218 and a front-contact member 219. The electromagnet coils 216 and 217 of the relay 43 are so connected to the generators 44 and 45 that the direction of current flow in the two windings is in opposite directions whereby the magnetic flux set up by energization of the two electromagnet coils is in opposite directions. The two generators 44 and 45 have substantially identical speed-voltage characteristics and, consequently, if the wheels 8 associated with the more heavily braked axle 9 and the wheels 8a associated with the less heavily braked axle 9a rotate at the same speed, the resultant magnetic flux produced in the magnetic core associated with the electromagnet coils 216, 217 of the relay 43 is substantially zero and as a result the back-contact member 218 and the front-contact member 219 are normally in circuit-closing and circuit-opening positions, respectively. If, due to the heavier braking force exerted on the wheels 8 and axle 9, slipping of the wheels 8 is initiated while the wheels 8a continue to rotate at a speed corresponding to the speed of travel of the train, the current supplied from generator 44 to the electromagnet winding 216 reduces rapidly from a value corresponding to the current supplied from the generator 45 to the electromagnet winding 217 on account of the decrease in voltage generated by the generator 44 at a decreased speed. Upon a sufficient reduction in the rotational speed of the wheels 8 and axle 9 during the slipping interval, the resultant magnetic flux produced in the magnetic core associated with the electromagnet coils 216 and 217 is in a direction to cause shifting of the back-contact member 218 and front-contact member 219 to circuit-opening and circuit-closing positions, respectively.

The magnet valve device 46 may comprise a double beat valve 221 which is yieldingly urged into an upper seated position by a spring 222 and which is actuated from the upper seated position to a lower seated position against the force of the spring 222 by an electromagnet 223 when the electromagnet 223 is energized. The double beat valve 221 is contained in a chamber 224 constantly connected to the brake cylinder 10 through a portion of the pipe 61 and is effective in the normal position shown, that is with the electromagnet 223 deenergized, to establish communication past the lower valve seat from the chamber 224 to a chamber 225 which is connected to another portion of the pipe 61 leading to the chamber 59 of the valve mechanism 11. Brake cylinder 10a is connected by a branch pipe 61a to the portion of the pipe 61 leading from the magnet valve device 46 to the valve mechanism 11. Thus, with the double beat valve 221 in its upper seated position, fluid under pressure supplied into the pipe 61 from chamber 59 of the valve mechanism 11 flows to the brake cylinder 10 and the brake cylinder 10a.

When the double beat valve 221 is in its lower seated position, communication between the chambers 225 and 224 is cut-off and communication is opened from the chamber 224 to a chamber 226 which is constantly open to atmosphere through an exhaust port 227. Thus fluid under pressure is released to atmosphere solely from the brake cylinder 10.

One of the terminals of the battery 18, hereinafter referred to as the positive terminal, is connected to the contact member 196 of the pressure switch 17 by a wire 231, and the opposite terminal of the battery 18, hereinafter called the negative terminal, is connected to ground. The contact member 197 of the pressure switch 17 is connected to the back-contact member 218 of the differential relay 43 by a wire 232, and the back-contact member 218, in the circuit-closing position thereof, connects the wire 232 to a wire 233 to which one terminal of the electromagnet 201 of relay 35 is connected. The opposite terminal of the electromagnet 201 of relay 35 is connected to the negative terminal of the battery 18, as through a ground connection including a wire 234 connecting the opposite terminal to ground. With the contact member 196 of the pressure switch 17 in engagement with the contact member 197, and with the back-contact member 218 of differential relay 43 in circuit-closing position, it will thus be apparent that a circuit is completed for energizing the electromagnet 201 of the relay 35 so that the front-contact members 202 and 203 of the relay 35 are actuated to circuit-closing position.

The contact member 202 of the relay 35 is connected by a branch wire 235, a wire 236 and wire 231 to the positive terminal of the battery 18 and, in the circuit-closing position thereof connects branch wire 235 to a wire 237 which is connected to the wire 232. Thus with the front-contact member 202 of relay 35 in circuit-closing position, a holding circuit is established for maintaining the electromagnet 201 of relay 35 energized independently of the separation of the contact member 196 of pressure switch 17 from the contact member 197.

The front-contact member 219 of the differential relay 43 is connected by a wire 239, wires 236 and 231 to the positive terminal of the battery 18, and when in circuit-closing position, connects the wire 239 to a wire 241 which is connected to one terminal of the electromagnet 223 of the magnet valve device 46 and to one terminal of the signal lamp 47. The opposite terminal of the electromagnet 223 and the opposite terminal of the signal lamp 47 are respectively connected to the negative terminal of battery 18 as by connections to ground in the manner shown. It will thus be seen that whenever the contact member 219 of relay 43 is in circuit-closing position the electromagnet 223 of the magnet valve device 246 is energized and the signal lamp 47 is illuminated.

The contact member 198 of the pressure switch 17 is connected, by a branch wire 243 and a wire 244 including a flexible portion, to the contact finger 162 of the retardation controller 13. The contact segment 163, associated with the contact finger 162, has a wire 245 connected thereto which, in the circuit-closing position of the contact member 203 of the relay 35, is connected to a wire 246 to which one terminal of the electromagnet 204 of relay 36 is connected. The opposite terminal of the electromagnet 204 is connected to the negative terminal of the battery 18 by a branch wire 247, wire 234, and through ground.

It will thus be seen that with the contact member 196 of the pressure switch 17 engaging the contact member 198, with the contact finger 162 of the retardation controller engaging the contact segment 163, and with the front-contact member 203 of the relay 35 in circuit-closing position, the electromagnet 204 of relay 36 is energized.

One terminal of the electromagnet 207 of the relay 37 is connected by a wire 249 to the contact segment 164 of the retardation controller 13 and the other terminal is connected to the negative terminal of the battery 18 through a ground connection including a branch wire 251 and the wire 234. Thus, with the contact member 196 of the pressure switch 17 engaging the contact member 198 and with the contact finger 162 of the retardation controller 13 engaging the contact segment 164, electromagnet 207 of relay 37 is energized.

One of the contact fingers 137 of the governor switch 12 has the wire 244 connected thereto and the other contact finger 137 is connected by a wire 252 to one terminal of the electromagnet 211 of the relay 38. The other terminal of the electromagnet 211 of relay 38 is connected to the negative terminal of the battery 18 as through a ground connection including a branch wire 253 and wire 234. Thus, with the contact member 196 of pressure switch 17 engaging contact member 198 and with the contact member 135 of the governor switch in circuit-closing engagement with the contact fingers 137, electromagnet 211 of relay 38 is energized.

Front-contact member 205 of relay 36 is constantly connected to the positive terminal of battery 18 through a branch wire 254, wires 235, 236 and 231 and in the circuit-closing position thereof connects the wire 254 to a wire 255 which is connected to the front-contact member 212 of the relay 38. Contact member 212 of relay 38, when in circuit-closing position, connects the wire 255 to the high train wire 31. One terminal of the electromagnet 108 of the magnet valve device 101 of the valve mechanism 11 is connected by a branch wire 261 to the high wire 31, the opposite terminal of the electromagnet being connected to the negative terminal of the battery 18 as through a ground connection in the manner shown. Thus, with the front-contact members 205 and 212 of the relays 36 and 38 respectively in circuit-closing positions, electromagnet 108 of the magnet valve device 101 is energized.

Back-contact member 208 of relay 37 is constantly connected to the positive terminal of the battery 18 by a wire 264, wires 235, 236 and 231 and in the circuit-closing position thereof connects the wire 264 to a wire 265 to which the front-contact member 213 of the relay 38 is connected. When the front-contact member 213 of the relay 38 is in circuit-closing position, it connects the wire 265 to the intermediate train wire 32. One terminal of the electromagnet 118 of the magnet valve device 102 of the valve mechanism 11 is connected to the intermediate train wire 32 by a branch wire 262, the other terminal being connected to the negative terminal of the battery 18, as through a ground connection in the manner shown. Thus, with the back-contact member 208 of relay 37 and front-contact member 213 of relay 38 both in circuit-closing position, the electromagnet 118 of the magnet valve device 102 is energized.

Front-contact member 206 of relay 36 is connected to the intermediate train wire 32 by a wire 266 and in a circuit-closing position thereof connects the wire 266 to a wire 267 to which the back-contact member 214 of the relay 38 is connected. In the circuit-closing position thereof, back-contact member 214 of relay 38 connects wire 267 to the wire 236 and thus to the positive terminal of the battery 18. Accordingly, it will be seen that with the front-contact member 206 of relay 36 in circuit-closing position and with the back-contact member 214 of relay 38 in circuit-closing position, electromagnet 118 of the magnet valve device 102 is energized independently of the circuit through back-contact member 208 of relay 27 and front-contact member 213 of relay 38.

Front-contact member 209 of the relay 37 is connected by a branch wire 268 to the wire 267 and in the circuit-closing position thereof connects the wire 268 to the low train wire 33. One terminal of the electromagnet 128 of the magnet valve device 103 of the valve mechanism 11 is connected to the train wire 33 by a branch wire 263, the other terminal being connected to the negative terminal of the battery 18 as through a ground connection in the manner shown. Thus, with the front-contact member 209 of relay 37 and back-contact member 214 of relay 38 both in circuit-closing position, the electromagnet 128 of the magnet valve device 103 is energized.

OPERATION OF EQUIPMENT SHOWN IN FIG. 1.

(a) *Running condition*

With the car or train running under power or coasting, with the handle 183 of the brake valve device 15 in the release position thereof, with the selector element 184 in either straight-air or automatic positions, and with the main reservoir 19 fully charged with fluid under pressure in the usual manner, fluid under pressure is supplied to the main reservoir pipe 22 and to the feed-valve pipe 26. As will appear hereinafter, with the brake valve handle 183 in release position, the supply valve 58 and the release valve 62 of the valve mechanism 11 are respectively in seated and unseated positions and, accordingly, the chamber 56 containing the supply valve 58 is charged with fluid under pressure from the main reservoir 19 through the main reservoir pipe 22 and branch pipe 57 while brake cylinders 10 and 10a are vented to atmosphere by way of pipe and passage 61, chamber 59 of valve mechanism 11 past the unseated release valve 62 and exhaust port 63 so that the brakes associated with the wheels fixed to the axles 9 and 9a are all released. Under the conditions assumed, front-contact member 219 of the differential relay 43 is in circuit-opening position and, consequently, the electromagnet 223 of the magnet valve device 46 is deenergized so that the brake cylinder 10 is connected through the magnet valve device 46 to the chamber 59 of the valve mechanism 11.

With the handle 183 of the brake valve device 15 in release position, connections are established through the brake valve device whereby fluid under pressure is supplied from the feed-valve pipe 26 into the brake pipe 24 so that it is accordingly charged with fluid under pressure as regulated by the feed valve 25.

From the brake pipe 24 fluid under pressure flows to the automatic valve device 14 where it acts on the operating piston thereof to condition the automatic valve device to establish communications through which the auxiliary reservoir 21 is charged with fluid under pressure from the brake pipe 24 and the pipe 181 is vented to atmosphere.

Brake pipe pressure acting in chamber 168 of retardation controller 13 shifts the piston 167 against the opposing force of the spring 169 into engagement with the stop shoulder 176 so that the stop flange 175 is positioned to initially tension the spring 154 of the retardation controller for service applications of the brakes.

In order to obtain some idea as to the relative fluid pressures in the various pipes and other parts of the equipment, let it be assumed that the main reservoir 19 is maintained charged to a pressure of one hundred and twenty-five pounds per square inch, that the feed-valve 25 regulates the pressure supplied to the feed-valve pipe 26 an thus the pressure in the brake pipe 24 to a pressure of one hundred and ten pounds per square inch, that the maximum pressure which may be established in the pipe 185 and thus in the control pipe 23 for straight-air applications is seventy-five pounds per sq. in., that the maximum pressure which is established in the control pipe 23 for automatic service applications of the brakes is seventy-five pounds per sq. in., and that the maximum pressure established in the control pipe 23 for emergency applications of the brakes, that is the pressure of equalization between the auxiliary reservoir 21 and the control pipe 23, is one hundred pounds per sq. in.

(b) *Application of the brakes initiated at train speeds in excess of a certain uniform speed*

For simplicity, no attempt will be made to specifically describe a straight-air application of the brakes, an automatic service application of the brakes, or an emergency application of the brakes, since the application of the brakes for any of these types of application is initiated by charging the control pipe 23 with fluid under pressure and since a complete description of the various types of application of the brakes, for an equipment similar to that shown and described herein, is given in the copending application of George W. Baughman, Serial No. 126,375, filed February 18, 1937, and assigned to the assignee of the present application. For further simplicity, it will be assumed that a certain fluid pressure, such as seventy-five pounds per sq. in., is established in the control pipe 23 to initiate the application of the brakes, and that unless otherwise specified, the pressure in the control pipe remains unchanged.

Let it now be assumed that an application of the brakes is initiated when the train is traveling at a speed of one hundred miles per hour, the governor switch device 12 being correspondingly in circuit-closing position and the relay 38 energized upon the shifting of the contact member 196 of the pressure switch 17 into contact with the contact member 198. As previously pointed out, the relay 35 is maintained energized, over a holding circuit including its own front-contact member 202, independently of the separation of the contact member 196 of the pressure switch 17 from the contact member 197.

In view of the fact that the contact finger 162 of the retardation controller 13 engages the contact segment 163 at the time the application of the brakes is initiated, the engagement of the contact member 196 with the contact member 198 of the pressure switch 17 completes the circuit previously described for energizing the electromagnet 204 of the relay 36.

With the electromagnets of the relays 36 and 38 energized and the electromagnet of the relay 37 deenergized, the circuits, previously described, for energizing the electromagnets 108 and 118 of the magnet valve devices 101 and 102, respectively, are completed.

Accordingly, fluid under pressure is supplied from the control pipe 23 and branch pipe and passage 23a to the diaphragm chambers 93, 94 and 95 under the control of the magnet valve devices 101, 102 and 103, respectively. Chamber 96 at the right of the smallest diaphragm 76, being directly connected to the passage 23a is likewise simultaneously charged to the pressure established in the control pipe 23.

Accordingly, it will be seen that the fluid pressure forces exerted on opposite sides of the diaphragms 74, 75 and 76 are balanced, only the largest diaphragm 73 having an unbalanced fluid pressure force acting thereon in the chamber 93. Thus the diaphragm 73 is flexed and the slidable member 66 shifted in the left-hand direction to effect operation of the release valve 62 and the supply valve 58, in the manner previously described, to supply fluid under pressure from the main reservoir pipe 22 to the brake cylinders 10 and 10a.

The pressure of the fluid supplied to the brake cylinders 10 and 10a acts in the chamber 59 on the left-hand face of the follower disc 76 associated with the largest diaphragm 73 and, when the force of the fluid pressure in the chamber 59 substantially balances the opposing force of the fluid pressure in the chamber 93, spring 71 becomes effective to shift the slidable member 66 sufficiently in the right-hand direction to operate the supply and release valves 58 and 62 to lap or close both the supply and the release communications so that the pressure established in the brake cylinders 10 and 10a is substantially equal and in a substantially one-to-one ratio to the pressure established in the control pipe 23. Since a pressure of seventy-five pounds per sq. in. is assumed to be established in the control pipe, the pressure established in the brake cylinders 10 and 10a will accordingly be seventy-five pounds per sq. in.

In the event of leakage of fluid under pressure from the brake cylinders 10 and 10a past the release valve 62 or in the event of reduction of the pressure in the brake cylinders for any other reason, the higher unbalanced pressure maintained in the chamber 93 again becomes effective to cause unseating of the supply valve 58 to replenish the supply of fluid under pressure to the brake cylinders from the main reservoir pipe 22. Upon the restoration of the pressure in the brake cylinders to a pressure corresponding to the pressure in the control pipe 23, the supply valve 58 is again seated. It will thus be seen that the valve mechanism 11 operates to maintain the pressure in the brake cylinders against leakage.

As the train speed reduces from the initial high speed of one hundred miles per hour, the contact finger 162 of the retardation controller 13 is gradually shifted in a counterclockwise direction because of the increase in the rate of retardation with the reduction in speed. When the contact finger 162 leaves the range A of retardation rates, that is, disengages from contact segment 163, and enters the range B of retardation rates, the circuit previously described whereby the electromagnet of the relay 36 is energized, is interrupted and the contact members 205 and 206 of relay 36 shifted to circuit-opening position. Assuming that the speed of the train is still in excess of the certain uniform speed of forty miles per hour and that the governor switch device 12 is accordingly in circuit-closing position to maintain the electromagnet of the relay 38 energized, it will be seen that electromagnet 118 of the magnet valve device 102 is maintained energized through a circuit including the back-contact member 208 of relay 37 and front-contact member 213 of the relay 38, independently of the operation of the front-contact member 206 of relay 36 to circuit-opening position, but that electromagnet 108 of the magnet valve device 101 is deenergized because the circuit therefor is interrupted due to the shifting of the contact member 205 of relay 36 into circuit-opening position. As in the previous instance, the electromagnet 128 of the magnet valve device 103 is deenergized because the front-contact member 209 of the relay 37 is in circuit-opening position.

As a result of the deenergization of the electromagnet 108 thereof, the magnet valve device 101 is actuated to cut off the supply of fluid under pressure to the diaphragm chamber 93 and to release fluid under pressure therefrom through the choke fitting 112. The restricted passage in the choke fitting 112 may be any desired size so that the rate of release of fluid under pressure from the chamber 93 may be timed to a desired rate. Obviously, upon the release of fluid under pressure from the chamber 93, the force acting on the largest diaphragm 73 and urging the slidable member 66 in the left-hand direction is diminished, so that the higher brake cylinder pressure in the chamber 59 tends to shift the diaphragm 73 in the right-hand direction. At the same time the reduction of the pressure in the chamber 93 causes a differential fluid pressure force to be exerted in the left-hand direction on the diaphragm 74. However, the differential fluid pressure force on the diaphragm 73 is larger than the differential fluid pressure force on the diaphragm 74 and consequently as the pressure in the chamber 93 reduces, the spring 71 becomes effective to unseat the release valve 62 and thus effect the release of fluid under pressure from the brake cylinders 10 and 10a, the rate of reduction of pressure in the brake cylinders 10 and 10a being determined according to the rate of reduction of the pressure in diaphragm chamber 93.

When the fluid under pressure in chamber 93 has been completely vented to atmosphere, the pressure in the brake cylinders 10 and 10a will obviously be determined according to the force exerted by the fluid under pressure in the chamber 94 on the diaphragm 74 and urging the slidable member 66 in the left-hand direction. Obviously, since brake cylinder pressure always acts on the follower disc 78 having an area corresponding to the effective area of the largest diaphragm 73 to oppose any force in the opposite direction, it will be seen that the pressure in the brake cylinders is reduced, upon the deenergization of the electromagnet 108 of the magnet valve device 101, to a pressure which bears a certain uniform ratio to the pressure established in the control pipe, which ratio is substantially the ratio of the effective area of the diaphragm 74 to the effective area of the diaphragm 73.

The diaphragms 73, 74, 75 and 76 may, of course, be of any desired area and relative areas, but for simplicity let it be assumed that the areas of the diaphragms 73, 74, 75 and 76 are 1, ¾, ½, and ⅓ units of area respectively. Assuming then that the area of the diaphragm 74 is three-fourths of the area of the diaphragm 73, the pressure established in the brake cylinders 10 and 10a, upon the deenergization of the electromagnet 108 of the magnet valve device 101 in the manner just described, is in ratio to the pressure established in the control pipe 23 as three is to four. With seventy-five pounds sq. in. pressure established in the control pipe 23, the brake cylinder pressure is reduced to approximately 56 pounds per sq. in.

Now let it be assumed that with the train speed still remaining above the certain uniform speed of forty miles per hour and notwithstanding the reduction in brake cylinder pressure as just described, the further reduction of speed of the train causes an increase in the rate of retardation of the train such that the contact finger 162 of the retardation controller 13 is shifted out of the range B of retardation rate and into the range C, wherein the contact finger engages contact segment 164.

The engagement of the contact finger 162 with the contact segment 164 of the retardation controller establishes a circuit, previously described, for energizing the electromagnet of the relay 37. Consequently, the back-contact member 208 and front-contact member 209 of the relay 37 are shifted to circuit-opening and circuit-closing positions, respectively.

The electromagnet 118 of the magnet valve device 102 is accordingly deenergized due to the interruption of the circuit thereof by shifting of the back-contact member 208 of relay 37 to circuit-opening position. The shifting of the front-contact member 209 of relay 37 to circuit-closing position is without effect at this time since the back-contact member 214 of the relay 38 is still held in circuit-opening position, relay 38 remaining energized for train speeds in excess of the certain uniform speed.

It will thus be seen that where previously the electromagnet 118 of the magnet valve device 102 was energized, now the electromagnets of all of the magnet valve devices 101, 102 and 103 are deenergized. As a result of the deenergization of the electromagnet of the magnet valve device 102, communication for the supply of fluid under pressure to the diaphragm chamber 94 is closed and the exhaust communication through the choke fitting 122 is opened, thereby effecting the release of fluid under pressure from the chamber 94 at a rate determined by the size of the restricted passage in choke fitting 122. As in the case of the reduction of fluid under pressure in the chamber 93, reduction of the pressure of fluid in the chamber 94 results in reduction of the pressure of fluid in the brake cylinders 10 and 10a at a rate determined according to the rate of reduction of the fluid under pressure in the chamber 94.

When the fluid under pressure in the chamber 94 is reduced to atmospheric pressure, the pressure established in the brake cylinders 10 and 10a is in substantially the same ratio to the pressure established in the control pipe 23 as the effective area of the diaphragm 75 is to the effective area of the diaphragm 73, that is on the basis of the assumed areas of the diaphragms, in the ratio of one to two. With a pressure of seventy-five pounds per sq. in. established in the control pipe 23, the pressure established in the brake cylinders 10 and 10a at this stage of the operation is accordingly approximately thirty-seven and one-half pounds per sq. in.

Let it now be assumed that with the brake control equipment conditioned as just described, that is, with the contact finger 162 of the retardation controller 13 in engagement with the contact segment 164 and a pressure established in the brake cylinder which has a one-to-two ratio to the pressure established in the control pipe 23, the speed of the train reduces below the certain uniform speed of forty miles per hour so that the governor switch device 12 is shifted to circuit-opening position to cause deenergization of the electromagnet 211 of the relay 38. The consequent shifting of the back-contact member 214 of relay 38 to circuit-closing position, completes the circuit previously described for energizing the electromagnet 128 of the magnet valve device 103, energization of which results in the closing of the supply communication to the chamber 95 and the opening of an exhaust communication for releasing fluid under pressure from the chamber 95 through the choke fitting 132.

Keeping in mind that the chambers 93 and 94 have been previously reduced to atmospheric pressure, the reduction of the pressure in the chamber 95 results in the reduction of the pressure in the brake cylinders 10 and 10a at a rate determined by the rate of reduction in pressure in the chamber 95, in a manner similar to that described with respect to the reduction of pressure in the chamber 93.

When the pressure of the fluid in the chamber 95 is reduced to atmospheric pressure, the corresponding pressure established in the brake cylinders 10 and 10a is in ratio to the pressure established in the control pipe 23 as the effective area of the diaphragm 76 is to the effective area of the diaphragm 73. Such ratio being assumed to be a one-to-three ratio, the pressure established in the brake cylinders 10 and 10a for a control pipe pressure of seventy-five pounds per sq. in. is twenty-five pounds per sq. in.

Let it now be assumed that the reduction of brake cylinder pressure just effected is such as to reduce the rate of retardation of the car or train sufficiently that the contact finger 162 of the retardation controller 13 recedes toward its normal position out of range C into the rang B, thereby disengaging contact segment 164. Disengagement of the contact finger 162 from the contact segment 164 interrupts the circuit previously described for energizing the electromagnet of the relay 37. Electromagnet 128 of magnet valve device 103 is accordingly deenergized due to the interruption of the energizing circuit therefor by the shifting of the front-contact member 209 of the relay 37 to circuit-opening position. The shifting of the back-contact member 208 of the relay 37 to circuit-closing position is ineffective to cause energization of the electromagnet 118 of the magnet valve device 102 due to the fact that the front-contact member 213 of the speed relay 38 is in circuit-opening position.

It will thus be seen that the electromagnets of the magnet valve devices 101, 102 and 103 of the valve mechanism 11 are again all deenergized simultaneously so that the diaphragm chambers 93, 94 are at atmospheric pressure and the chambers 95 and 96 are charged to the pressure established in the control pipe 23. Accordingly, it will be seen that the valve mechanism 11 is operated to resupply fluid under pressure to the brake cylinders 10 and 10a to build up the pressure therein to a pressure having a one-to-two ratio to the pressure established in the control pipe, or approximately thirty-seven and one-half pounds per sq. in.

Should the contact finger 162 of the retardation controller 13 recede sufficiently toward its normal position as to enter the range A and thereby engage the contact segment 163, a further increase in brake cylinder pressure is effected. It will be seen that such is the case because the engagement of the contact finger 162 with the contact segment 163 of the retardation controller completes a circuit, previously described, for energizing the electromagnet of the relay 36, thus causing the circuit for energizing the electromagnet 118 of the magnet valve device 102 to be completed through the back-contact member 214 of the relay 38 and the front-contact member 206 of relay 36. The circuit for energizing the electromagnet of the magnet valve device 101 is not completed despite the shifting of the front-contact member 205 of relay 36 to circuit-closing position, because the front-contact member 212 of the relay 38 remains in circuit-opening position. Thus, with only the electromagnet 118 of the magnet valve device 102 energized, diaphragm chambers 94, 95 and 96 are charged to the pressure established in the control pipe 23, while only the chamber 93 is at atmospheric pressure. Accordingly, an increase in pressure in the brake cylinder pressure is effected to the degree that the pressure in the brake cylinders bears a three-to-four ratio to the pressure established in the control pipe 23, or approximately fifty-six pounds per sq. in.

If as the speed of the train further reduces, the rate of retardation increases sufficiently, so that the contact finger 162 of the retardation controller again leaves the range A of retardation rates and enters either of the other ranges B or C of rates of retardation, brake cylinder pressures corresponding thereto and previously described are established in the manner previously described.

When the car or train is brought to a complete stop, the contact finger 162 of the retardation controller automatically returns to its normal position in engagement with the contact finger 163 and thus the pressure established in the brake cylinders to hold the car or train at a standstill will bear a three-to-four ratio to the pressure established in the control pipe 23, or approximately fifty-six pounds per sq. in.

(c) Applications of the brakes initiated at train speeds below the certain uniform speed If an application of the brakes is initiated at a time that the train is traveling at a speed below the certain uniform speed of forty miles per hour so that the governor switch 12 is in circuit-opening position and the relay 38 controlled thereby is accordingly deenergized, it will be seen that the maximum brake cylinder pressure established will bear a three-to-four ratio to the pressure established in the control pipe, as compared to the maximum or one-to-one ratio established in the case of an application of the brakes initiated at a time that the train was traveling at a speed in excess of the certain uniform speed.

It will be apparent that such is the case for with the contact finger 162 in engagement with the contact segment 163 of the retardation controller 13 and with the electromagnet of the relay 36 accordingly energized, only the electromagnet 118 of the magnet valve device 102 is energized, the energizing circuit including the back-contact member 214 of the relay 38 and the front-contact member 206 of the relay 36. The electromagnet 108 of the magnet valve device 101 is not energized, despite the shifting of the front-contact member 205 of relay 36 to circuit-closing position, because the front-contact member 212 of the relay 38 is in circuit-opening position. Electromagnet 128 of the magnet valve device 103 is not energized because electromagnet 207 of the relay 37 is deenergized and, consequently, the front-contact member 209 of the relay 37 is in circuit-opening position to interrupt the circuit for energizing the electromagnet of the magnet valve device 103.

As in the case of the deceleration of the train from a speed in excess of the certain uniform speed of forty miles per hour, after having been reduced to speeds below forty miles per hour, the ratio between the pressure established in the brake cylinders 10 and 10a and the pressure established in the control pipe 23 is determined according to the position of the contact finger 162 of the retardation controller 13 in range A, range B or range C of retardation rates. Thus, as the speed of the train reduces following an application of the brakes initiated at the time the train is traveling at a speed below forty miles per hour, valve mechanism 11 is automatically controlled to vary the ratio between the brake cylinder pressure and the pressure established in the control pipe according to the retardation of the train being within range A, range B or range C of retardation rates.

(d) Release of the brakes

The brakes may be released at any time by reducing the pressure in the control pipe 23 to atmospheric pressure. In such case, with all of the diaphragm chambers 93, 94, 95 and 96 reduced to atmospheric pressure, the spring 71 causes shifting of the slidable member 66 in the right-hand direction and the consequent operation of the release valve 62 to completely release fluid under pressure from the brake cylinders 10 and 10a, the valve mechanism 11 thus being returned to the position shown in Fig. 1.

Upon the reduction of the pressure in the control pipe 23 to atmospheric pressure, the pressure switch 17 is operated so that the contact member 196 is shifted out of contact with contact finger 198 and into contact with the contact finger 197. Thus the electromagnet of relay 36 is maintained energized until the pressure in the control pipe 23 is reduced to the relatively low pressure of one or two pounds per sq. in. and sufficient to cause disengagement of the contact member 196 from the contact finger 198. In order, therefore, to permit immediate reduction in brake cylinder pressure upon reduction in the pressure in the control pipe 23 and also reduction of brake cylinder pressure independently of the magnet valve devices 101, 102 and 103 of the valve mechanism 11, the check valves 93a, 94a and 95a are provided. Thus, it will be seen that even though the magnet valve devices 101, 102 and 103 are conditioned to supply fluid under pressure to the diaphragm chambers 93, 94 and 95, reduction of pressure in the control pipe 23 causes the higher pressure previously established in the chambers 93, 94 and 95 to respectively unseat the check valves and thus effect equalization of the pressure in the diaphragm chambers with the pressure in the control pipe. It will be apparent that the check valves 93a, 94a and 95a function at any time during an application of the brakes to vary the pressure in the diaphragm chambers 93, 94 and 95 in accordance with a variation in the pressure in the control pipe 23 so as to correspondingly vary the pressure in the brake cylinders 10 and 10a, without, however, causing variation of the particular ratio in effect at the time between the pressure in the brake cylinder and the pressure in the control pipe 23.

If the car or train is withdrawn from service, obviously it is not desirable that the wheel slip relay 35 be permitted to continue in the energized condition over the holding circuit previously described. Accordingly a suitable switch (not shown) may be provided for effecting deenergization of the electromagnet of the wheel-slip relay 35 when the car or train is not in operation.

(e) Wheel-slipping occurring during application of the brakes initiated at a time that the train speed is in excess of a certain uniform speed As thus far described, it has been assumed, for simplicity, that the application of the brakes was not attended by a slipping or a sliding of any of the wheels of the car or train, and in such respect, the operation of the equipment shown in Fig. 1 is substantially identical to that described for the embodiment shown in Fig. 1 of the Patent 2,096,505 of George W. Baughman, above referred to.

According to our invention, however, additional equipment is included in the embodiment shown in Fig. 1 of the present application for guiding against sliding of the car wheels.

Let it, therefore, now be assumed that the initial pressure established in the brake cylinder 10 upon the initiation of an application of the brakes when the train is traveling at a speed, such as one hundred miles per hour, causes the wheels 8 associated with the more heavily braked axle 9 to begin to slip, that is reduce in speed from a rotational speed corresponding to the speed of travel of the train to a zero rotational speed corresponding to a locked condition of the wheel. The actual slipping time, that is, the time over which the wheels 8 decelerate from a rotational speed, corresponding to the speed of travel of the train, to zero rotational speed is of appreciable magnitude, being in many cases of the order of one second. Therefore, during the slipping time, current supplied from the generator 44, driven from the axle 9, to the electromagnet winding 216 of the differential relay 43 decreases sufficiently that the front-contact member 219 and the back-contact member 218 of the relay 43 are actuated, respectively, to circuit-closing position and circuit-opening position.

Upon the shifting of the front-contact member 219 of differential relay 43 to said closed position, the signal lamp 47 and the electromagnet 223 of the magnet valve device 46 are energized over circuits previously described. With the double beat valve 221 of the magnet valve device 46 accordingly shifted to its lower seated position, fluid under pressure is immediately and rapidly vented from brake cylinder 10 to atmosphere through the exhaust port 227 of the magnet valve device 46.

Because the holding circuit for the wheel-slip relay 35 is maintained only when the back-contact member 218 of the differential relay 43 is in circuit-closing position, it will be apparent that the wheel-slip relay 35 is deenergized when the contact member 218 is shifted to circuit-opening position.

Keeping in mind that under the circumstances assumed, that is, an application of the brakes initiated at a time the train is traveling at a speed in excess of the certain uniform speed (40 M. P. H.), and that the relays 36 and 38 are accordingly energized initially, and the relay 37 is deenergized initially to cause the establishment of a brake cylinder pressure having a one-to-one ratio to the pressure established in the control pipe 23, it will be seen that shifting of the front-contact member 203 of the wheel-slip relay 35 to circuit-opening position as a result of the deenergization of the wheel-slip relay 35 as just described, interrupts the circuit for energizing the electromagnet of the relay 36. Deenergization of relay 36 results in the deenergization of the electromagnet 108 of the magnet valve device 101, due to the interruption of the energizing circuit for electromagnet 108 by the shifting of the front-contact member 205 of the relay 36 to circuit-opening position.

The electromagnet 118 of the magnet valve device 102 remains energized, however, because the back-contact member 208 of relay 37 and the front-contact member 213 of the relay 38 are in circuit-closing positions. The electromagnet 128 of the magnet valve device 103 is not energized because both the back-contact member 214 of the relay 38 and the front-contact member 209 of the relay 37 are in circuit-opening position.

As in previously described instances, with only the electromagnet 118 of the magnet valve device 102 energized, the valve mechanism 11 is conditioned to reduce the brake cylinder pressure from the initially established degree to a degree having the next lower ratio with respect to the pressure in the control pipe, that is, a three-to-four ratio. Still maintaining the assumption that the pressure established in the control pipe 23 is seventy-five pounds per sq. in., brake cylinder pressure in the brake cylinder 10a is accordingly reduced from the initial pressure of seventy-five pounds per sq. in. to a pressure of approximately fifty-six pounds per sq. in.

Due to the rapidity of the response of the differential relay 43 and the magnet valve device 46 to the initiation of a wheel-slipping condition of wheels 8 associated with the axle 9, the pressure in the brake cylinder 10 is reduced at a sufficiently rapid rate that before attaining a zero rotational speed corresponding to the locked position thereof, the wheels 8 on the axle 9 accelerate back to the rotational speed corresponding to the speed of travel of the train so that, as far as the wheels 8 associated with the axle 9 are concerned, wheel sliding does not occur.

When the wheels 8 on the axle 9 again attain a rotational speed substantially equivalent to the rotational speed of the wheels 8a associated with the axle 9a, the magnetic fluxes set up by the separate electromagnet coils 216 and 217 again substantially counterbalance each other and the relay contact members 218 and 219 are shifted to circuit-closing and circuit-opening positions, respectively. Accordingly, the signal lamp 47 is extinguished and electromagnet 223 of the magnet valve device 46 is deenergized due to the shifting of the contact member 219 to circuit-opening position. It follows that the double beat valve 221 of the magnet valve device 46 is correspondingly returned to its upper seated position and communication between the brake cylinder 10 and the brake cylinder 10a is restored, so that the reduced pressure established in the brake cylinder 10a is also established in the brake cylinder 10.

The return of the back-contact member 218 of the differential relay 43 to circuit-closing position, however, is without effect at this time in effecting re-energization of the electromagnet 201 of the wheel-slip relay 35 because the contact member 196 of the pressure switch 17 is maintained in its upper position in contact with the contact finger 198 and out of contact with the contact finger 197. It will thus be seen that once the differential relay 43 is actuated during an application of the brakes to effect deenergization of the electromagnet of the wheel-slip relay 35, the relay 35 is locked out against further energization even though the differential relay 43 subsequently returns to its normal position.

As will be seen hereinafter, the only way in which the wheel-slip relay 35 may be subsequently reenergized and the holding circuit therefor through its own contact member 202 established, is by reducing the pressure in the control pipe 23 substantially to atmospheric pressure, which in turn amounts to complete release of the brakes.

With the wheel-slip relay 35 thus locked in its deenergizing position, the circuit for energizing the electromagnet of the relay 36 is maintained open at the contact member 203 of relay 35, and unless the wheel slip relay 35 is reenergized in the manner just indicated, the maximum pressure attainable in the brake cylinders thereafter is that determined by the condition of the valve mechanism 11 wherein only the electromagnet 118 of the magnet valve device 102 is energized, or in other words a three-to-four ratio with respect to the pressure established in the control pipe 23.

As in the previously described operation wherein no wheel-sliding occurred, the retardation controller 13 continues to exercise control of brake cylinder pressure dependent upon the rate of retardation of the train being within range A, range B or range C. In view of the fact that the relays 37 and 38 are controlled by the retardation controller 13 and the governor switch device 12 independently of the wheel-slip relay 35, it will be seen that the occurrence of a wheel-slipping condition for the wheels 8 associated with the axle 9 at a time that the train is being retarded at a rate within the range B or the range C does not result in a reduction of brake cylinder pressure from the particular ratio with respect to the control pipe pressure established under the control of the retardation controller 13 and the governor switch 12.

It will thus be seen that the equipment which we have provided functions automatically to reduce the braking force, as represented by brake cylinder pressure, on all of the vehicle wheels immediately upon the occurrence of a wheel-slipping condition on a particular set of car wheels which are more heavily braked than the other car wheels. Being less heavily braked as compared to the vehicle wheels 8, it follows that the vehicle wheels 8a and the other wheels on the train cannot attain a wheel-slipping condition until after a wheel-slipping condition is attained on the wheels 8. Since the equipment which we have provided functions to prevent actual sliding of the wheels 8, it will be apparent that except in rare instances, sliding of the wheels 8a and other similarly braked wheels of the train cannot occur.

In the event that the reduction of pressure in the brake cylinders 10 and 10a, as automatically effected upon the slipping of the wheels 8 associated with the more heavily braked axle 9, is insufficient to prevent re-occurrence of the wheel slipping condition of the wheels 8 upon the restoration of the reduced pressure in the brake cylinder 10, no further automatic reduction in brake cylinder pressure is effected since the relay 35 is locked in deenergized position. However, the driver or operator, observing the illumination of signal lamp 47, may effect a desired reduction in the pressure of the control pipe 23 and thus correspondingly effect a reduction in brake cylinder pressure, so that sliding of the wheels other than the wheels 8 may be prevented if the operator is on the alert and reduces the control pipe pressure immediately upon the illumination of the signal lamp 47.

In a similar manner if slipping of the wheels 8 associated with the axle 9 occurs when the contact finger 162 of the retardation controller is either the range B or range C of rates of retardation, the operator may reduce the pressure in the control pipe and accordingly prevent sliding of the wheels of the train.

(f) *Wheel-slipping occurring during application of the brakes initiated at a time that the train speed is less than a certain uniform speed*

As will be recalled from previous description, the maximum initial brake cylinder pressure which can be established in the case of an application of the brakes initiated at a time that the train is traveling at a speed below the certain uniform speed of forty miles per hour is lower than at speeds above this value. In this case the governor switch 12 is in circuit-opening position and the relay 38 is deenergized, only the electromagnet 118 of the magnet valve device 102 of the valve mechanism 11 then being energized and, consequently, the maximum initial brake cylinder pressure which can be established is one which bears a three-to-four ratio to the pressure established in the control pipe. With seventy-five pounds per square inch pressure in the control pipe 23, such brake cylinder pressure is approximately fifty-six pounds per square inch.

In the event that such initial brake cylinder pressure is sufficiently high that the braking force exerted on the more heavily braked wheels 8 associated with the axle 9 begin to slip, a reduction in the brake cylinder pressure is immediately effected. As will be recalled, under the conditions assumed, the electromagnet 118 of the magnet valve device 102 is energized through a circuit including the back-contact member 214 of the relay 38 and the front-contact member 206 of the relay 36. Thus, when the relay 36 is deenergized, following the deenergization of the wheel-slip relay 35 as result of the slipping of the wheels 8, the circuit for energizing the electromagnet 118 of the magnet valve device 102 is interrupted due to the shifting of the front-contact member 206 of relay 36 to circuit-opening position. The relays 37 and 38 being deenergized at this time, it will be readily apparent that the electromagnets 108 and 128 of the magnet valve devices 101 and 103 are deenergized at this time so that upon the deenergization of the electromagnet of the magnet valve device 102, the electromagnet of each of the magnet valve devices 101, 102 and 103 is deenergized.

As will be remembered from previous descriptions, the ratio established between brake cylinder pressure and the pressure in the control pipe 23 by the valve mechanism 11 under such circumstances is a one-to-two ratio, which is the next lower ratio to the three-to-four ratio initially established. Thus the pressure of the fluid in the brake cylinder 10a and in the other similarly controlled brake cylinders associated with other wheels of the train is automatically reduced from a three-to-four ratio to a one-to-two ratio, with respect to the control pipe pressure.

At the same time and in the same manner as previously described for slipping of the wheels 8 while the train was traveling at a speed in excess of the certain uniform speed of forty-miles per hour, the signal lamp 47 is illuminated and the magnet valve device 46 is actuated to vent fluid under pressure from the brake cylinder 10. Upon the return of the wheels 8 to a rotational speed corresponding to the speed of travel of the train and substantially equivalent to the rotational speed of the wheels 8a associated with the axle 9a, the differential relay 43 is returned to its normal position wherein the signal lamp 47 is extinguished and the magnet valve device 46 again establishes communication between the brake cylinder 10 and the brake cylinder 10a. Likewise, the return of the back-contact member 218 of the differential relay 43 to circuit-closing position is ineffective to cause re-energization of the wheel-slip relay 35, and the relay 35 accordingly remains locked in deenergized condition.

Thus, as in the previous case, upon the slipping of the wheels 8 the valve mechanism 11 is conditioned to limit the brake cylinder pressure to the next lower ratio with respect to the pressure in the control pipe 23, so that re-occurrence of the wheel-slipping condition on the wheels 8 is unlikely.

If a slipping of the wheels 8 should occur while the train is traveling at a speed below the certain uniform speed, that is, while the governor switch 12 is in circuit-opening position, and while the train is being retarded at a rate within either the range B or range C, the wheel-slipping condition of the wheels 8 is indicated by the signal lamp 47 but no automatic reduction in brake cylinder pressure is effected. However, as previously described, the operator may manually effect a reduction in the pressure of the control pipe 23 and thereby reduce the pressure in the brake cylinders sufficiently rapidly to prevent sliding of the wheels.

EMBODIMENT SHOWN IN FIG. 2

The embodiment represented by Fig. 2 is substantially identical to the embodiment shown in Fig. 1 and differs therefrom in the substitution of a wheel-slip relay 35a in the place of the wheel-slip relay 35 shown in Fig. 1.

Wheel-slip relay 35a differs from the wheel-slip relay 35 in having, in addition to the two front-contact members 202 and 203, a contact member 300 which, when the electromagnet 201 of the relay is energized, is shifted from a lower circuit-closing position to an upper circuit-closing position. In its upper circuit-closing position, contact member 300 connects a wire 249a which is connected to the contact segment 164 of the retardation controller 13, to a wire 249b which is connected to the non-grounded terminal of the electromagnet 207 of the relay 37. In the lower circuit-closing position, thereof the contact member 300 of relay 35a connects a wire 249c, which is connected to the positive terminal of the battery 18 through the wires 235 and 236, to the wire 249b.

In operation, therefore, it will be seen that should the more heavily braked wheels 8 on the axle 9 begin to slip during an application of the brakes, the resultant deenergization of the wheel-slip relay 35a not only interrupts the energizing circuit for the relay 36 due to the shifting of the contact member 203 to circuit-opening position, but also effects energization of electromagnet 207 of relay 37 by completing the circuit from the positive terminal of the battery 18 to the wire 249b through contact member 300.

The effect of energizing the relay 37 at the same time that the relay 36 is deenergized, as a result of the wheels 8 beginning to slip, is to condition the valve mechanism 11 to limit the maximum brake cylinder pressure, thereafter effected, to the second lower ratio, with respect to the control pipe pressure, as compared to the first lower ratio relative to maximum initial ratio at the time that the application of the brakes is initiated effected in the embodiment shown in Fig. 1.

Should the more heavily braked wheels 8 associated with the axle 9 begin to slip upon the initiation of an application of the brakes at a time that the train is traveling at a speed in excess of the certain uniform speed of which the governor switch device 12 is in circuit-closing position, it will be seen that the shifting of the contact member 205 of the relay 36 into circuit-opening position interrupts the circuit for energizing the electromagnet 108 of the high magnet valve device 101 and that the shifting of the contact member 208 of the relay 37 to circuit-opening position interrupts the circuit for energizing the electromagnet 118 of the magnet valve device 102. In view of the fact that the back-contact member 214 of the speed relay 38 is held in circuit-opening position, the closing of the front-contact member 209 of relay 37 is without effect and the electromagnet 128 of the low magnet valve device 103 is accordingly deenergized.

Thus, when the wheel-slip relay 35a, is deenergized in response to a slipping of the wheels 8, the valve mechanism 11 is changed from the initial condition thereof wherein the electromagnets of the magnet valve devices 101 and 102 are energized and the electromagnet of the magnet valve device 103 is deenergized, to the condition wherein the electromagnets of all the magnet valve devices 101, 102 and 103 are deenergized. Thus, assuming that the brake cylinder pressure initially established in the brake cylinders 10 and 10a had reached its full initial one-to-one ratio with respect to the pressure established in the control pipe, the pressure in the brake cylinders 10 and 10a is reduced and limited to a one-to-two ratio with respect to the pressure established in the control pipe.

As in the case of the wheel slip relay 35, the wheel-slip relay 35a is locked in deenergized position once the differential relay 43 operates to interrupt the holding circuit therefor through the front-contact member 202 of the wheel-slip relay 35a and, accordingly, as described for the embodiment shown in Fig. 1, the wheel-slip relay 35a cannot again be energized unless the pressure in the control pipe 23 is reduced substantially to atmospheric pressure to permit the contact member 196 of the pressure switch 17 to re-establish the initial energizing circuit for the wheel-slip relay 35a.

Assuming that the wheel-slip relay 35a is deenergized in response to a slipping of the wheels 8 during an application of the brakes initiated at a time that the train is traveling at a speed below the certain uniform speed as determined by the governor switch device 12, it will be seen that the valve mechanism 11 is changed from the initial condition thereof, wherein only the elecromagnet 118 of the intermediate magnet valve device 102 is energized by way of the back-contact 214 of speed relay 38 and the front-contact 206 of the relay 36, to the condition wherein only the electromagnet 128 of the low magnet valve device 103 is energized. It will be apparent that the shifting of the front-contact member 206 of the relay 36 to circuit-opening position effects deenergization of the electromagnet 118 of the intermediate magnet valve device 102 and that the shifting of the front-contact member 209 of the relay 37 to circuit-closing position completes the circuit for energizing the electromagnet 128 of the low magnet valve device 103.

Since the maximum initial ratio between brake cylinder pressure and pressure established in the control pipe 23 for applications of the brakes initiated at train speeds less than the certain uniform speed of forty miles per hour, is a three-to-four ratio, it follows that in the event of slipping of the wheels 8, the valve mechanism 11 is automatically conditioned to limit the brake cylinder pressure to a one-to-three ratio with respect to the control pipe pressure.

In view of the fact that the embodiment of the invention represented in Fig. 2 functions in other respects as does the embodiment shown in Fig. 1, such operation is not repeated herein.

EMBODIMENT SHOWN IN FIGS. 3 AND 4

The embodiment shown in Fig. 3 is identical with the embodiment shown in Fig. 1 in many respects and differs from the equipment shown in Fig. 1 principally in employing a different type of mechanism for detecting slipping of the more heavily braked wheels 8 associated with the axle 9. The representation of the embodiment shown in Fig. 3 is accordingly limited to only those elements which are required to point out the manner of application and operation of the different type of wheel-slip detecting means.

The equipment employed in the embodiment shown in Fig. 3 which is not employed in the embodiment shown in Fig. 1, includes a wheel-slip detecting device 310, a so-called brake cylinder pressure switch device 311, and in place of the wheel-slip relay 35, two relays 35b and 35c, respectively.

The wheel-slip detecting device 310 may comprise an inertia element in the form of a fly-wheel 315 mounted for rotation relative to a shaft rotating with the wheels 8, such as the axle 9, by roller or ball bearings in the manner shown, a pair of resilient contact fingers 316 and 316a carried in insulated relation on the fly-wheel 315, and a torque arm 317 fixed to the axle 9.

The contact fingers 316 and 316a may be of any suitable material and are secured at one end, as by screws 319, to an insulating member 318 affixed to the fly-wheel 315 near the periphery thereof and extending in parallel relation to the axle 9. The contact fingers 316 extend in parallel spaced relation past opposite sides of the axle 9 and have sufficient inherent resiliency or are biased by spring means (not shown) so that the free ends of the fingers engage in circuit-closing contact.

The torque arm 317 comprises a hub portion 321 fixed as by a key 320 to the axle 9 and a laterally extending portion 322 of T-shape, located in alignment with and extending into the space between the contact fingers 316 and 316a, the width of the portion 322 conforming closely to the distance between the inner faces of the contact fingers 316 and 316a. (See Fig. 4.)

The contact fingers 316 and 316a are so designed and so tensioned that as long as the axle 9 is not rotatively accelerated or decelerated with respect to the fly-wheel 15 at a rate in excess of a certain rate, the contact fingers 316 and 316a remain in contact with each other against the force exerted to cause rotation of the fly-wheel 315 with the axle 9 and wheels 8, through the medium of the torque arm 317 and one of the contact fingers 316 or 316a. If the axle 9 is rotatively decelerated at a rate in excess of the certain rate, as when the wheels 8 fixed to the axle 9 begin to slip, the force exerted on one of the contact fingers 316 and 316a by the torque arm 317 is sufficiently great to cause separation of the contact fingers 316 and 316a and interruption of a circuit controlled thereby.

In view of the fact that contact fingers 316 and 316a rotate with the fly-wheel 315, it is necessary to provide a pair of collector rings 323 and 323a mounted in insulated relation on the axle 9 and connected to the contact fingers 316 and 316a, respectively, as by wires 324 and 325, and a pair of suitably mounted brushes 326 cooperating respectively with the collector rings 323 and 323a.

The brake cylinder pressure switch 311 is similar in construction to the pressure switch 17 and may comprise a casing containing a piston 331 having a stem 332 connected in insulated relation to a movable contact member 333. The piston 331 is subject at one side to the pressure of fluid in a chamber 334 which is connected, through a branch pipe 61b, to that portion of the pipe 61 connecting the magnet valve device 58 to the brake cylinder 10 associated with the more heavily braked wheels 8. Movement of the piston 331 by the pressure of the fluid in the chamber 334 is yieldingly resisted by a spring 335 at the opposite side of the piston. The tension of the spring 335 is such that when the pressure in the chamber 334 and thus in the brake cylinder 10 is below a certain uniform pressure, such as five pounds per square inch, and sufficient to relieve slipping of the wheels 8 under any condition, piston 331 is actuated downwardly to the position shown wherein the contact member 333 engages a lower contact member 336. When the pressure of the fluid in the chamber 334 exceeds the said certain uniform pressure, the spring 335 is overcome and the piston 331 and the contact member 333 are shifted upwardly, the contact member 333 disengaging the contact member 336 and engaging an upper contact member 337.

The relay 35b comprises an electromagnet 201b, a front contact member 203b, two back-contact members 341 and 342 and a contact member 343. The contact member 343 has a lower circuit-closing position when the electromagnet 201b is deenergized, and an upper circuit-closing position when the electromagnet 201b is energized.

The relay 35c comprises an electromagnet 201c, a front-contact member 344 and a back-contact member 345.

The centrifuge 141 of governor switch device 12 is driven according to the speed of travel of the car or train, as through gears 351 connecting the centrifuge to any element which rotates according to the speed of the car or train, such as the axle 9a to which are fixed the more lightly braked wheels 8a.

The control circuits of the embodiment represented in Fig. 3 are substantially identical to the control circuits of the embodiment shown in Fig. 1 and already described and for the sake of simplicity, only the differences relative to the embodiment shown in Fig. 1 will be pointed out. One of the brushes 326 associated with the collector ring 323 on the axle 9 is connected by a wire 352 to a wire 353 which is in turn connected to the contact member 197 of the pressure switch 17. The other brush 326, associated with the collector ring 323a, is connected to one terminal of the electromagnet 201b of the relay 35b by a wire 354 and the opposite terminal of the electromagnet 201b is connected to the negative terminal of the battery 18, as through a ground connection including the wire 234. It will thus be seen, that with the contact fingers 316 and 316a of the wheel-slip detector 310 in circuit-closing contact and with the contact member 196 of the pressure switch 17 in engagement with the contact member 197, a circuit is established for energizing the electromagnet of the relay 35b.

The contact member 333 of the brake cylinder pressure switch 311 is connected to the positive terminal of the battery 18 by a wire 356 and the wires 236 and 231. The contact member 336 of the pressure switch 311 is connected by a wire 357 to the contact member 344 of the relay 35c and to the contact member 341 of the relay 35b by the wire 357 and a branch wire 358. The contact member 337 of the pressure switch 311 is connected to the contact member 342 of the relay 35b by a wire 359.

In its circuit-closing position, the contact member 341 of the relay 35b connects the wire 358 to a wire 361 to which one terminal of the electromagnet of the relay 35c is connected, the other terminal of the electromagnet of the relay 35c being connected to the negative terminal of battery 18 as by a connection through ground in the manner indicated. It will thus be seen that with the contact member 333 of the pressure switch 311 engaging the contact member 336, and with the wheel-slip relay 35b deenergized and the contact member 341 thereof in circuit-closing position, a circuit is completed for energizing the electromagnet of the relay 35c. In its circuit-closing position, the contact member 344 of the relay 35c connects the wire 357 to a wire 363 which is connected to the wire 236 and thus to the positive terminal of the battery 18. Accordingly, it will be seen that once the electromagnet of relay 35c is energized, a holding circuit is established for maintaining the relay energized independently of the pressure switch 311, the holding circuit extending from the positive terminal of the battery 18 through the contact member 344 of the relay 35c, wires 357 and 358, contact member 341 of the relay 35b, electromagnet of the relay 35c, and thence to the negative terminal of the battery 18 through ground.

In its circuit-closing position, the contact member 342 of the relay 35b connects the wire 359 to a wire 365 which is, in turn, connected to the back-contact member 345 of the relay 35c. In its circuit-closing position, the back-contact member 345 of the relay 35c, connects the wire 365 to a wire 366 to which one terminal of the electromagnet of the magnet valve device 46 is connected, the other terminal of the electromagnet of the magnet valve device 46 being connected to the negative terminal of the battery 18, as through a ground connection in the manner shown. Thus, with the contact member 333 of the pressure switch 311 engaging the contact member 337, and with the back-contact members 342 and 345 of the relays 35b and 35c, respectively, both in circuit-closing position, it will be seen that a circuit is completed for energizing the electromagnet of the magnet valve device 46.

Once the electromagnet 201b of the relay 35b is energized and the contact member 343 of relay 35b actuated to its upper circuit-closing position, a holding circuit is established for maintaining the relay 35b energized, independently of the separation of the contact member 196 of the pressure switch 17 from the contact member 197, it being apparent that in its circuit-closing position, the contact member 343 of the relay 35b connects the wire 236 and thus the positive terminal of the battery 18 to the wire 353 and thus to the wire 352 leading to that one of the brushes 326 associated with the collector ring 323 of the wheel-slip detector device 310. When the electromagnet of the relay 35b is deenergized and the contact member 343 shifted to its lower circuit-closing position, a circuit is completed from the positive terminal of the battery 18 through the wire 236, contact member 343 of relay 35b, a wire 368, signal lamp 47, a wire 369 which is connected to ground, and back through ground to the negative terminal of the battery 18. Since the relay 35b is normally energized, it will be apparent that the signal lamp 47 is normally extinguished and that it is illuminated only upon the deenergization of the relay 35b as a result of separation of the contact fingers 316 and 316a of the wheel-slip detector device 310.

OPERATION OF EMBODIMENT SHOWN IN FIG. 3

It is deemed unnecessary to describe in detail the operation of the embodiment represented in Fig. 3, since this would in large measure repeat what has already been described in connection with the embodiment shown in Fig. 1. So far as possible, therefore, only those differences of operation resulting from the employment of the wheel-slip detector 310 will be pointed out.

Assuming, therefore, that the train is travelling at a speed of, for example, one hundred miles per hour and that an application of the brakes has been initiated by supplying fluid at a pressure of seventy-five pounds per square inch to control pipe 23, it will be apparent that the valve mechanism 11 is controlled in identically the same manner as previously described for the embodiment shown in Fig. 1 to control the degree of the application of the brakes.

Keeping in mind that the holding circuit through the contact member 343 of the relay 35b includes the contact fingers 316 and 316a of the wheel-slip detector 310, it will be seen that should a separation of the contact fingers 316 and 316a occur as the result of the initiation of a slipping of the wheels 8 associated with the axle 9, the relay 35b will be deenergized. Accordingly, since the contact member 333 of the brake cylinder pressure switch 311 is in its upper position engaging the contact member 337, the return of the back contact member 342 of the relay 35b to circuit-closing position completes a circuit previously described for energizing the electromagnet of the magnet valve device 46, which is accordingly operated to immediately and rapidly vent fluid under pressure from the brake cylinder 10 applying the brakes to the wheels 8. At the same time, the shifting of the contact member 343 of the relay 35b to its lower circuit-closing position causes the signal lamp 47 to be illuminated to indicate the slipping of the wheels 8.

At the same time also, the shifting of the front contact member 203b of the relay 35b to circuit-opening position, interrupts the circuit through the contact finger 162 and contact segment 163 of the retardation controller 13 whereby the relay 36 was energized, thus effecting deenergization of the high train wire 31 in the same manner as previously described for shifting of the contact member 203 of the relay 35 of Fig. 1 to circuit-opening position upon a slipping of the wheels 8. Accordingly, the valve mechanism 11 is conditioned to limit the subsequent pressure for the brake cylinder 10a, as well as the brake cylinder 10 to a degree corresponding to the next lower ratio with respect to the pressure established in the control pipe 23. On the basis of the ratios between brake cylinder pressure and control pipe pressure determined by the valve mechanism 11 as previously assumed, it will be seen that the valve mechanism 11 is conditioned to limit the subsequent maximum ratio between brake cylinder pressure and the pressure in the control pipe 23 to a three-to-four ratio instead of the maximum or one-to-one ratio.

When the reduction of the pressure of the fluid in the brake cylinder 10, as effected by the magnet valve device 46, is sufficient to cause the wheels 8 to accelerate back toward a rotational speed corresponding to the speed of travel of the train and the pressure switch 311 is correspondingly actuated from its upper to its lower circuit-closing position wherein the contact member 333 thereof engages contact member 336, the circuit through the back-contact member 341 of the relay 35b, previously described, is completed and the electromagnet of the relay 35c is energized. At the same time, the electromagnet of the magnet valve device 46 is deenergized, due to the interruption of the energizing circuit therefor by the separation of the contact member 333 of the pressure switch 311 from the contact member 337, and due to the energization of the relay 35c and the consequent establishment of the holding circuit therefor through the contact member 344 of the relay 35c and the back-contact member 341 of the relay 35b, previously described, the magnet valve device 46 is prevented from being further energized as long as the relay 35b remains deenergized, due to the back-contact member 345 of relay 35c being held in circuit-opening position.

Reengagement of the contact fingers 316 and 316a of the wheel-slip detector 310, following the return of the wheels 8 of the rotational speed corresponding to the speed of travel of the train is, however, ineffective to cause re-energization of the relay 35b since with the seventy-five pounds per square inch pressure maintained in the control pipe 23, the contact member 196 of the pressure switch 17 is out of engagement with the contact member 197. Thus, the initial circuit for energizing the relay 35b cannot be completed unless the pressure in the control pipe 23 is reduced substantially to atmospheric pressure, and the brakes thereby substantially released, to permit the contact member 196 to reengage the contact member 197, in which case the relay 35b is energized so that the holding circuit therefor is again set up through the contact member 343 of the relay 35b, and the signal lamp 47 is extinguished.

If, upon a slipping of the wheels 8, the engineman or operator of the car or train does not reduce the pressure established in the control pipe 23, the relay 35b accordingly remains deenergized and consequently the relay 35c remains energized over the holding circuit including the front-contact member 344 of the relay 35c and the back-contact member 341 of the relay 35b, regardless of the fact that the contact member 333 of the brake cylinder pressure switch 311 is again shifted, by the restoration of pressure in the brake cylinder 10 following the deenergization of the magnet valve device 46, out of engagement with the contact member 336. With the back-contact member 345 of the relay 35c thus held in circuit-opening position, the reengagement of the contact member 333 of the pressure switch 311 with the contact member 337, as a result of the restoration of the pressure in the brake cylinder 10, is ineffective to complete the circuit for energizing the magnet valve device 46. Thus, the magnet valve device 46 remains deenergized for the remainder of the application of the brakes, assuming no reduction in the established pressure in the control pipe 23, so that the pressure reestablished in the brake cylinder 10 bears the next lower ratio from the maximum ratio with respect to the pressure established in the control pipe 23.

If slipping of the wheels 8 occurs upon an application of the brakes initiated at a time that the train is traveling at a speed less than the certain uniform speed of forty miles per hour as determined by the setting of the governor switch device 12, the deenergization of the relay 35b as a result of the separation of the contact fingers 316 and 316a of the wheel-slip detector 310 operates, in the same manner as does the opening of the contact member 203 of the relay 35 of Fig. 1 under the same condition, to so condition the valve mechanism 11 as to limit the brake cylinder pressure to the next lower ratio with respect to the pressure in the control pipe 23. As will be recalled from the operation of the embodiment shown in Fig. 1, the maximum initial ratio between brake cylinder pressure and the pressure in the control pipe 23 when the application of the brakes is initiated at a time that the train is traveling at a speed less than said certain uniform speed of forty miles per hour is a three-to-four ratio. It will thus be seen that slipping of the wheels 8 in the embodiment shown in Fig. 3 will similarly cause the valve mechanism 11 to be conditioned to limit brake cylinder pressure during the remainder of the application to a one-to-two ratio with respect to the pressure established in the control pipe 23.

It will be apparent that, upon the slipping of the wheels 8, a two-step reduction in the ratio between brake cylinder pressure and the pressure in the control pipe 23 may be effected in the embodiment shown in Fig 3 instead of a one-step reduction by adding an additional contact member to the relay 35b, corresponding to the contact member 300 of the relay 35a shown in Fig. 2, whereby relay 37 will be energized at the same time that the relay 36 is deenergized.

ADAPTION OF INVENTION TO A TRAIN BRAKE CONTROL SYSTEM

The manner in which our invention is adapted to control the brakes on a train of cars of either the articulated or the non-articulated type should be readily apparent. Obviously, the brake cylinders for applying the brakes on wheel-and-axle units not shown in the drawings are respectively under the control of valve mechanisms corresponding to the valve mechanism 11, the magnet valve devices 101, 102, and 103 of each valve mechanism being respectively connected to the train wires 31, 32 and 33.

Furthermore, it should be obvious that additional governor switch devices similar to the governor switch device 12 shown in the drawings may be privided in parallel connected relation for insuring the proper control of the valve mechanisms 11 in the event of failure of one of the governor switch devices.

It will be understood that instead of providing a main reservoir pipe 22 in the manner shown, local supply reservoirs may be provided at intervals along the length of the train, and charged in any suitable manner either from the brake pipe or from another supply pipe whereby an adequate and immediately available supply of fluid under pressure is assured for each brake cylinder along the length of the train.

SUMMARY

Summarizing, it will be seen that we have disclosed several embodiments of a brake control equipment effective to control the application of the brakes automatically both according to the speed of the train and according to the rate of retardation of the train, and including means whereby the degree of the application of the brakes is automatically and rapidly decreased and limited to a reduced degree upon the occurrence of wheel-slipping, so as to prevent wheel-slipping and so as to render recurrence of wheel-slipping unlikely.

By associating wheel-slip detecting means with a particular set of wheels which is more heavily braked than the remaining sets of wheels on the train, the automatic reduction and limitation of the degree of the brake application precedes the possible occurrence of the wheel-slipping or wheel-sliding condition on the sets of wheels other than the more heavily braked set of wheels.

The embodiments shown in Figs. 1 and 3 effect a certain reduction in brake cylinder pressure from that established initially when a slipping of the more heavily braked wheels occurs, while the embodiment shown in Fig. 2 causes a greater reduction in brake cylinder pressure upon a slipping of the more heavily braked wheels.

It will be understood that while we have shown and described our invention illustratively in certain specific forms, certain omissions, additions or modifications may be effected in the embodiments shown without departing from the spirit of our invention. It is accordingly not our intention to limit the scope of our invention except as it is necessitated by the scope of the prior art.

Having now described our invention, what we claim as new and desire to secure by Letters Patent is:

1. In a vehicle or train brake system, in combination, brake control means for controlling the degree of braking force with which the brakes are applied, means responsive to the speed of the train, means operatively responsive only to the slipping of a vehicle wheel, the speed-responsive means and the wheel-slip responsive means being jointly effective to control the operation of the brake control means.

2. In a car or train brake system, in combination, brake control means adapted to control the supply and release of fluid under pressure for controlling the degree of braking force with which the brakes are applied, means responsive to the rate of retardation of the train, means responsive to the speed of the train, and means operatively responsive only to the slipping of a car wheel, the retardation-responsive means, the speed-responsive means, and the wheel-slip responsive means all being effective to control the operation of the brake control means.

3. In a vehicle or train brake system, in combination, a brake cylinder, a normally uncharged pipe chargeable with fluid under pressure, brake control means variously conditionable to cause a plurality of certain different uniform ratios between the pressure established in the said pipe and the pressure in the brake cylinder, means responsive to the rate of retardation of the train for conditioning said brake control means differently for different rates of retardation of the train and thereby causing different ratios between the pressure established in the control pipe and the pressure in the brake cylinder, and means operatively responsive only to the slipping of a vehicle-wheel for conditioning the said brake control means to cause it to establish a lower ratio between the pressure in the brake cylinder and the pressure in the said pipe than that effected under the sole control of the said retardation-responsive means.

4. In a vehicle or train brake system, in combination, a brake cylinder, a normally uncharged pipe chargeable with fluid at different pressures, brake control means veriously conditionable to effect a plurality of certain different uniform ratios between the pressure established in the said pipe and the pressure in the brake cylinder, means responsive to the speed of the train for variously conditioning said brake control means to cause it to establish one of the certain uniform ratios at one speed and another of said uniform ratios at another speed, and means responsive to the slipping of a vehicle wheel for varying the condition of the said brake control means to effect a different ratio between the pressure in the brake cylinder and the pressure established in the said pipe than that determined solely under the control of the said speed-responsive means.

5. In a vehicle or train brake system, in combination, a brake cylinder, a normally uncharged pipe chargeable with fluid at different pressures, a brake control means variously conditionable to cause a plurality of certain different uniform ratios between the pressure established in the said pipe and the pressure established in the brake cylinder, means responsive to variations in the rate of retardation of the train for variously conditioning the brake control means as to cause it to effect one of said certain ratios at one rate of retardation and a different one of said certain ratios at another rate of retardation, means responsive to variations in the speed of the train for variously conditioning the brake control means to cause it to establish different ones of said certain ratios between the brake cylinder pressure and the pressure in the said pipe dependent upon the speed of the train, and means responsive to the slipping of a vehicle wheel for also varying the condition of the brake control means to cause it to establish different ratios between the brake cylinder pressure and the pressure in the said pipe than that determined merely under the control of the retardation-responsive means and the speed-responsive means.

6. In a vehicle or train brake system, in combination, a first brake cylinder for effecting application of the brakes on one wheel of the train, a second brake cylinder for effecting application of the brakes on a second wheel of the train, brake control means for controlling the supply of fluid under pressure to and the release of fluid under pressure from both of said brake cylinders, means responsive to the slipping of said one train wheel, independent means controlled by the said wheel-slip responsive means and effective upon the slipping of the said one wheel for rapidly reducing the pressure in only the said first brake cylinder to prevent sliding of the said one wheel, said brake control means being controlled by the wheel-slip responsive means so as to reduce the pressure in the second brake cylinder and to limit the pressure obtainable in both the brake cylinders for the remainder of the application of the brakes after slipping of the said one wheel ceases, to a maximum pressure which is less than the brake cylinder pressure at the time that the said one train wheel begins to slip.

7. In a vehicle or train brake system, in combination, a first brake cylinder for effecting application of the brakes on one wheel of the train with a certain degree of braking force for a given pressure in the brake cylinder, a second brake cylinder for effecting application of the brakes on a different wheel of the train with a lesser degree of braking force for the said given pressure of fluid therein, brake control means for controlling the supply fluid under pressure to and the release of fluid under pressure from both of said brake cylinders, means responsive to the slipping of the said one train wheel, independent means controlled by the said wheel-slip responsive means and effective upon the slipping of the said one wheel for rapidly reducing the pressure in only the said first brake cylinder to reduce the degree of braking force on the said one wheel and thus to prevent sliding of the said one wheel, said brake control means being controlled by the wheel-slip responsive means so as to reduce the pressure in said second brake cylinder and to limit the maximum pressure attainable in both the brake cylinders for the remainder of the application of the brakes after slipping of the said one wheel ceases to a pressure which is less than the maximum initially attainable prior to the slipping of the said one train wheel.

8. In a vehicle or train brake system, in combination, a brake cylinder for effecting application of the brakes on a vehicle wheel, brake control means variously conditionable to control the degree of the pressure in the said brake cylinder, means operatively responsive to the slipping of the said vehicle wheel, independent means controlled by the wheel-slip responsive means for rapidly reducing the pressure in the said brake cylinder to a relatively low degree to prevent sliding of the said wheel and effective to restore the pressure in the brake cylinder upon the cessation of the slipping of the said wheel, the said brake control means being controlled by the wheel-slip responsive means, when said wheel slips, to limit the pressure restored in the brake cylinder to a lower pressure than that at the time the slipping of the wheel was initiated.

9. In a vehicle or train brake system, in combination, a brake cylinder, a normally uncharged pipe chargeable with fluid at different pressures to initiate an application of the brakes, brake control means effective upon the charging of the pipe with fluid under pressure to cause fluid under pressure to be supplied to the said brake cylinder, means for variously conditioning the said brake control means to cause it to establish pressures in the brake cylinder having only certain uniform ratios to the pressure established in the said pipe, means responsive to the slipping of a train wheel, means controlled by the wheel-slip responsive means for independently and rapidly reducing the pressure in the said brake cylinder to prevent sliding of the said train wheel and to cause it to return to a speed of rotation corresponding to the speed of travel of the train, and means controlled by the wheel-slip responsive means for controlling the conditioning means for the brake control means so as to cause the brake control means to limit the pressure restored in the said brake cylinder upon alleviation of slipping of the said wheel to a pressure having a lower ratio with respect to the pressure established in the said pipe as compared to the ratio at the time the slipping of the said wheel was initiated.

10. In a vehicle or train brake system, in combination, a first train wheel and a second train wheel, a first brake cylinder and a second brake cylinder for effecting application of the brakes on the said first and the said second wheels respectively, two generators of substantially uniform speed-voltage characteristics driven according to the speed of rotation of the said one wheel and the said second wheel respectively, a differential relay device having two opposing windings energized respectively from said two generators, said differential relay device having a certain position when the speed of the said first and said second wheels are substantially equal and having a different position when said first wheel slips, independent means controlled by the differential relay and effective in the second position of the differential relay for rapidly reducing the pressure established in the said first brake cylinder to alleviate the slipping of and restore said first wheel to a rotational speed corresponding to the speed of travel of the train, and brake control means controlling the supply of fluid under pressure to and the release of the fluid under pressure from both said brake cylinders and effective when the differential relay is actuated to the second position thereof to reduce the pressure in the said second brake cylinder and to limit the pressure restored in the said first brake cylinder, when slipping of the said first wheel ceases, to a lower pressure than that at the time the slipping of the said first wheel began.

11. In a vehicle or train brake system, in combination, a first train wheel and a second train wheel, a first brake cylinder and a second brake cylinder for effecting application of the brakes on the said first and the said second wheels respectively, two generators of substantially uniform speed-voltage characteristics driven according to the speed of rotation of the said one wheel and the said second wheel respectively, a differential relay device having two opposing windings energized respectively from said generators, said differential relay having a certain position when the speed of the said first and said second wheels are substantially equal and having a different position when the said first wheel slips, independent means controlled by the differential relay and effective in the second position of the differential relay for rapidly reducing the pressure established in the said first brake cylinder to alleviate the slipping of the said first wheel and restore it to a rotational speed corresponding to the speed of travel of the train, and brake control means controlling the supply of fluid under pressure to and the release of fluid under pressure from both the said brake cylinders and effective when the differential relay is actuated to the second position thereof to reduce the pressure in the said second brake cylinder and to limit the restored pressure in the said first brake cylinder, when slipping of the said first wheel ceases, to a lower pressure than that at the time the slipping of the said first wheel began, and means effective upon the return of the differential relay to its said first position to prevent the return of the brake control means to the condition at the time the slipping of said first wheel began.

12. In a vehicle or train brake system, in combination, means including electroresponsive means adapted to control the supply and release of fluid under pressure for controlling the degree of the braking force, means controlled according to the speed of the train, means controlled according to the rate of retardation of the train, and means actuated only upon the slipping of a train wheel, said last three means all functioning to control said electroresponsive means.

13. In a vehicle or train brake system, in combination, brake control means including electroresponsive means, said brake control means being adapted when the electroresponsive means is energized for causing the brakes to be applied with a certain degree of braking force and adapted when the electroresponsive means is deenergized for causing the brakes to be applied with a certain different degree of braking force, means responsive to the rate of retardation of the train, means responsive to the slipping of a train wheel, and means controlled jointly by the retardation-responsive means and the wheel-slip responsive means for controlling energization and deenergization of said electroresponsive means.

14. In a vehicle or train brake system, in combination, a brake cylinder, brake control means for controlling the supply of fluid under pressure to and the release of fluid under pressure from the brake cylinder, electroresponsive means effective when energized to cause the brake control means to establish a certain pressure in the brake cylinder and when deenergized to effect a lower pressure in the brake cylinder, means controlling the circuit of the electroresponsive means and effective as long as the rate of retardation of the train does not exceed a certain rate for causing energization of the said electroresponsive means, and means responsive to the slipping of a train wheel for causing operation of the said circuit-controlling means to effect deenergization of the said electroresponsive means.

15. In a vehicle or train brake system, in combination, a brake cylinder, brake control means controlling the supply of fluid under pressure to and the release of fluid under pressure from the brake cylinder, electroresponsive means effective when energized to cause the brake control means to establish a certain pressure in the brake cylinder and when deenergized to effect a lower pressure in the brake cylinder, a device for controlling the circuit of the electroresponsive means and effective as long as the rate of retardation of the train does not exceed a certain rate for causing energization of the said electroresponsive means, means responsive to the slipping of a train wheel for causing operation of the circuit-controlling device to effect denergization of the said electroresponsive means, and means effective, when said wheel-slip responsive means operates in response to the slipping of the train wheel, for preventing the said device from thereafter causing re-energization of the electroresponsive means during the remainder of the application of the brakes.

16. In a vehicle or train brake system, in combination, a brake cylinder, brake control means for controlling the supply of fluid under pressure to and the release of fluid under pressure from the brake cylinder, a first and a second electroresponsive means for controlling the operation of the brake control means and causing it to establish different degrees of pressure in the brake cylinder, a first means effective to cause energization of the said first electroresponsive means as long as the rate of retardation of the train does not exceed a certain rate, a second means effective to cause energization of the said second electroresponsive means only when the rate of retardation of the train exceeds a second certain rate higher than the said first certain rate, and a third means responsive to the slipping of a train wheel for controlling both said first and said second means.

17. In a vehicle or train brake system, in combination, a brake cylinder, brake control means for controlling the supply of fluid under pressure to and the release of fluid under pressure from the brake cylinder, a first electroresponsive means, a second electroresponsive means, said first electroresponsive means and said second electroresponsive means being effective when energized and deenergized, respectively, to so control the brake control means as to cause it to establish a certain pressure in the brake cylinder, effective when both are deenergized to establish pressure in the brake cylinder lower than said certain pressure, and effective when the first electroresponsive means is deenergized and the second electroresponsive means is energized to establish a pressure in the brake cylinder lower than the said lower pressure, a first means effective to cause energization of the said first electroresponsive means as long as the rate of retardation of the train does not exceed a certain rate, a second means effective to cause energization of the said second electroresponsive means only when the rate of retardation of the train exceeds a second certain rate higher than the said first certain rate, and a third means responsive to the slipping of a train wheel for so controlling both the said first and said second means as to cause deenergization of the first electroresponsive means and energization of the second electroresponsive means regardless of the rate of retardation of the train.

18. In combination, a rotary inertia element, two spaced contact fingers carried on the inertia element and biased in opposite directions into contact with each other, a rotary shaft, a torque arm fixed to the said shaft and having a projecting portion extending between the two contact fingers, whereby rotation of the rotary inertia element is effected upon rotation of the rotary shaft, said contact fingers being so biased as to resist separation thereof unless said rotary shaft accelerates or decelerates with respect to the said rotary element at a rate in excess of a certain uniform rate, and means operating on a circuit controlled by the engagement or disengagement of the contact fingers.

19. The combination with a vehicle wheel and a shaft rotating according to the speed of rotation of the said vehicle wheel, of a rotary inertia element, two spaced contact fingers carried by the rotary inertia element and biased in opposite directions into contact with each other, a torque arm fixed to the said rotary shaft and having a portion extending between the two contact fingers whereby rotation of the rotary inertia element is caused by rotation of the rotary shaft, said contact fingers being so biased as to remain in contact with each other as long as the said rotary shaft does not accelerate or decelerate with respect to said rotary element at a rate in excess of a certain rate and separable only when the rate of acceleration or deceleration of the rotary shaft relative to said rotary inertia element exceeds said certain rate, a circuit controlled by the engagement and disengagement of the contact fingers, and means operating on said circuit for indicating acceleration or deceleration of the said rotary shaft and accordingly of the said vehicle wheel at a rate in excess of said certain rate.

20. The combination with a vehicle wheel and a brake cylinder for effecting applications of the brakes to retard rotation of said vehicle wheel, of brake control means for controlling the supply of fluid under pressure to and the release of fluid under pressure from the brake cylinder, valve means operative independently of the brake control means for releasing fluid under pressure from the brake cylinder, means responsive to deceleration of the vehicle wheel at a rate in excess of a certain uniform rate for causing operation of the said valve means to release fluid under pressure from the brake cylinder, and means responsive to the reduction of the pressure in the brake cylinder to below a certain pressure for controlling the valve means to prevent further release thereby of fluid under pressure from the brake cylinder.

21. The combination with a vehicle wheel and a brake cylinder for effecting application of the brakes to retard rotation of the vehicle wheel, of brake control means for controlling the supply of fluid under pressure to and the release of fluid under pressure from the brake cylinder, a valve device in the communication from the brake control means to the brake cylinder and normally conditioned to open communication from the brake control means to the brake cylinder, means responsive to the deceleration of the vehicle wheel at a rate in excess of a certain uniform rate for causing operation of said valve device to close the communication between the brake control means and the brake cylinder and to open a communication through which fluid under pressure is released from the brake cylinder, and means responsive to the reduction in brake cylinder pressure to below a certain pressure for causing operation of the valve means to re-open the communication from the brake control means to the brake cylinder and to close the release communication.

22. The combination with a vehicle wheel and a brake cylinder for effecting application of the brakes to retard rotation of a vehicle wheel, of brake control means for controlling the supply of fluid under pressure to and the release of fluid under pressure from the brake cylinder, a communication through which fluid under pressure is supplied to and released from the brake cylinder under the control of the brake control means, a magnet valve device controlling said communication and effective, when deenergized, to open the communication and, when energized, to close the communication and esetablish another communication through which fluid under pressure is released from the brake cylinder to atmosphere, a circuit on which the magnet valve device operates, means effective upon the deceleration of the vehicle wheel at a rate in excess of a certain rate for completing the circuit and causing energization of the magnet valve device, a pressure responsive switch device effective as long as the pressure in the brake cylinder exceeds a certain uniform pressure for completing said circuit and operative when the pressure in the brake cylinder reduces below the said certain uniform pressure for interrupting said circuit, and means controlled by the pressure responsive switch device and effective once the pressure switch device interrupts said circuit for interrupting the said circuit for the duration of the application of the brakes despite the operation of the pressure switch to circuit-closing position upon the restoration of pressure in the brake cylinder above the certain uniform pressure.

23. In a vehicle brake system, in combination, means for effecting an application of the brakes, reducing means operative to reduce the degree of application of the brakes in predetermined steps, means operated according to the rate of retardation of the vehicle, means operated according to the speed of the vehicle, means operative upon slipping of a vehicle wheel due to application of the brakes, and means cooperatively relating said last three means to severally and jointly control the operation of said reducing means.

24. The method of controlling vehicle brakes, which comprises, initiating an application of the brakes, reducing the degree of the application by a predetermined amount when the vehicle speed has reduced to a chosen speed or the rate of retardation of the vehicle exceeds a limiting value, whichever occurs first, and reducing the degree of the application by said predetermined amount in the event of a vehicle wheel slipping, regardless of whether the vehicle has reduced in speed to said chosen speed or the rate of retardation exceeds said limiting rate.

25. In a vehicle or train brake system, in combination, means for effecting application and release of the brakes, electroresponsive means effective when energized to cause the brakes to be applied with a certain degree of braking force and when deenergized to cause the brakes to be applied with a lower degree of braking force, means controlled according to the speed of the train, means controlled according to the rate of retardation of the train, and means responsive to the slipping of a train wheel, said last three means functioning jointly to effect energization of said electroresponsive means and individually effective to cause deenergization thereof.

26. In a vehicle or train brake system, in combination, brake control means for effecting application and release of the brakes and for controlling the degree of braking force with which the brakes are applied, means responsive to the rate of retardation of the train, means responsive to the speed of the train, and means responsive to the slipping of a train wheel, the retardation-responsive means, speed-responsive means, and wheel-slip responsive means jointly controlling said brake control means to cause it to establish a certain degree of braking force if the rate of retardation of the train is less than a certain rate and the speed of the train exceeds a certain uniform speed and there is no slipping of said train wheel, said retardation-responsive means being effective when the rate of retardation of the train exceeds said certain uniform rate to cause the brake control means to effect a certain degree of reduction in braking force, the speed-responsive means being effective when the speed of the train decreases below said certain uniform speed to cause operation of the brake control means to reduce the braking force said certain degree and the wheel-slip responsive means being effective if slipping of the said train wheel occurs to cause operation of the brake control means to reduce the braking force said certain degree, only one of the said three responsive means being effective dependent upon which becomes first effective.

27. In a vehicle or train brake system, in combination, means for effecting application and release of the brakes, electroresponsive means effective when energized to cause the brakes to be applied with a certain degree of braking force and when deenergized to cause the brakes to be applied with a second certain braking force less than said certain degree, means controlled according to the speed of the train, means controlled according to the rate of retardation of the train, and means operatively responsive to the slipping of a train wheel, said last three means being jointly effective when the train exceeds a certain uniform speed while the rate of retardation is less than a certain uniform rate and there is no slipping of said train wheel for causing energization of said electroresponsive means, said speed-controlled means, said retardation-controlled means and said wheel-slip responsive means being individually effective to cause deenergization of said electroresponsive means when the speed of the train reduces below said certain uniform speed, when the rate of retardation of the train exceeds said certain uniform rate, and when slipping of the said train wheel occurs, respectively.

28. In a vehicle or train brake system, in combination, a brake cylinder, a normally uncharged pipe chargeable with fluid at different pressures, brake control means operatively responsive to the charging of said pipe with fluid under pressure to cause fluid under pressure to be supplied to the brake cylinder to effect application of the brakes, said brake control means being variously conditionable to establish pressures in the brake cylinder having certain different uniform ratios to the pressure established in said pipe, and means operative automatically only upon the slipping of a vehicle or train wheel for effecting a variation in the condition of said brake control means to cause it to reduce the brake cylinder pressure from a higher to a lower one of said certain ratios to the pressure in said pipe.

29. In a vehicle or train brake system, in combination, a brake cylinder, a normally uncharged pipe chargeable with fluid at different pressures, brake control means operatively responsive to the charging of said pipe with fluid under pressure to cause fluid under pressure to be supplied to the brake cylinder to effect application of the brakes, said brake control means being variously conditionable to establish pressures in the brake cylinder having certain different uniform ratios to the pressure established in said pipe, means operative automatically upon the slipping of a vehicle or train wheel for effecting a variation in the condition of said brake control means to cause it to reduce the brake cylinder pressure from a higher to a lower one of said certain ratios to the pressure in said pipe, and means effective to prevent variation of the condition of the brake control means upon cessation of the slipping of said wheel so as to thereafter effect an increase to a higher one of said certain ratios from the reduced ratio during a given application of the brakes.

30. In a vehicle or train brake system, in combination, a brake cylinder, a normally uncharged pipe chargeable with fluid at different pressures, brake control means operatively responsive to the charging of said pipe with fluid under pressure to cause fluid under pressure to be supplied to the brake cylinder to effect application of the brakes, said brake control means being variously conditionable to establish pressures in the brake cylinder having certain different uniform ratios to the pressure established in said pipe, means operative automatically upon the slipping of a vehicle or train wheel for effecting a variation in the condition of said brake control means to cause it to reduce the brake cylinder pressure from a higher to a lower one of said certain ratios to the pressure in said pipe, and means effective to prevent variation in the condition of the brake control means upon cessation of the slipping of said wheel so as to thereafter effect an increase to a higher one of said certain ratios from the reduced ratio unless the pressure in said pipe is first reduced below a certain uniform pressure.

31. In a vehicle or train brake system, in combination, a brake cylinder, a normally uncharged pipe chargeable with fluid at different pressures, brake control means operatively responsive to the charging of said pipe with fluid under pressure to cause fluid under pressure to be supplied to the brake cylinder to effect application of the brakes, said brake control means being variously conditionable to establish pressures in the brake cylinder having certain different uniform ratios to the pressure established in said pipe, means operative automatically upon the slipping of a vehicle or train wheel for effecting a variation in the condition of said brake control means to cause it to reduce the brake cylinder pressure from a higher to a lower one of said certain ratios to the pressure in said pipe, means effective to prevent variation of the condition of the brake control means upon cessation of the slipping of said wheel so as to thereafter effect an increase to a higher one of said certain ratios from the reduced ratio during a given application of the brakes, and means operative upon a reduction of the pressure in said pipe to below a certain uniform pressure for rendering said last means ineffective.

32. In a vehicle or train brake system, in combination, a brake cylinder, brake control means for controlling the supply of fluid under pressure to and the release of fluid under pressure from the brake cylinder, electroresponsive means effective when energized to cause the brake control means to establish a certain pressure in the brake cylinder and when deenergized to effect a lower certain pressure in the brake cylinder, means responsive to the slipping of a train wheel for effecting deenergization of said electroresponsive means, and means effective once the said train wheel slips for preventing the wheel-slip responsive means from effecting reenergization of said electroresponsive means during the remainder of the application notwithstanding cessation of slipping of said wheel.

33. The method of controlling vehicle wheel brakes comprising effecting an application of the brakes, rapidly reducing the degree of application of the brakes associated with a wheel that begins to slip, and continuing to reduce the degree of application of the brakes on the slipping wheel as long as the application exceeds a certain uniform low degree, and then effecting reapplication of the brakes on the wheel which slipped.

34. A vehicle brake system comprising means for effecting application and release of the brakes associated with the vehicle wheels, means responsive to slipping of a vehicle wheel due to application of the brakes for causing release of the brakes on the slipping wheel, and means responsive to the degree of application of the brakes on the slipping wheel for controlling reapplication of the brakes on the slipping wheel independently of the wheel-slip responsive means.

35. In a vehicle brake system, in combination, means for effecting application of the brakes on a vehicle wheel, means for detecting slipping of said wheel due to the application of the brakes thereon, a device for releasing the brakes on said wheel and for reapplying the brakes thereon, and means for causing said device to be subject first to the control of said wheel slip detecting means and then to the intensity of the brake application on said wheel independently of the wheel-slip detecting means.

36. A vehicle brake system comprising means for effecting application and release of the brakes associated with the vehicle wheels, means responsive to slipping of a vehicle wheel due to application of the brakes by the first said means for causing release of the brakes on the slipping wheel and subsequently conditioned, when the slipping wheel returns toward a speed corresponding to vehicle speed, so as to tend to cause reapplication of the brakes on the slipping wheel, and means for preventing reapplication of the brakes on the slipping wheel unless the application of the brakes on the slipping wheel is first reduced below a certain uniform degree.

37. In a vehicle brake system, in combination, means for effecting application of the brakes associated with the vehicle wheels, means responsive to slipping of a vehicle wheel caused by application of the brakes, means controlled initially by the wheel-slip responsive means for initating the release of the brakes when the wheel begins to slip, and means controlled by the intensity of the brake application on the slipping wheel for subsequently controlling the last said means to terminate the release and to effect reapplication of the brakes on the wheel independently of the wheel-slip responsive means.

38. In a vehicle brake system, in combination, a brake cylinder operative upon the supply of fluid under pressure thereto to effect application of the brakes and upon the release of fluid under pressure therefrom to effect the release of the brakes associated with a vehicle wheel, means for detecting the slipping of the wheel due to application of the brakes, means operated initially under the control of said wheel-slip detecting means to initiate the release of fluid under pressure from the brake cylinder when the wheel begins to slip, and means controlled by brake cylinder pressure independently of the wheel-slip detecting means for controlling the subsequent operation of the last said means to cause it to terminate the release of fluid under pressure from the brake cylinder and to effect the resupply of fluid under pressure to the brake cylinder.

39. In a vehicle brake equipment of the type having a brake cylinder to which fluid under pressure is supplied to effect application of the brakes and from which fluid under pressure is vented to effect release of the brakes associated with a vehicle wheel, valve means normally in a position to establish communication through which fluid under pressure is supplied to the brake cylinder and operative to a different position to close said communication and vent fluid under pressure from the brake cylinder in response to the initiation of slipping of the wheel, and means effective once the said valve means is operated to its said different position for maintaining it therein until the pressure in the brake cylinder reduces below a certain uniform low pressure.

CLYDE C. FARMER.
GEORGE W. BAUGHMAN.